United States Patent [19]

Asgari et al.

[11] Patent Number: 5,488,555
[45] Date of Patent: Jan. 30, 1996

[54] METHOD AND APPARATUS FOR FOUR WHEEL STEERING CONTROL

[75] Inventors: Jahanbakhsh Asgari; Minh N. Tran, both of Inkster; Davorin D. Hrovat, Dearborn, all of Mich.

[73] Assignee: Ford Motor Company, Dearborn, Mich.

[21] Appl. No.: 67,930

[22] Filed: May 27, 1993

[51] Int. Cl.⁶ .............................. G06G 7/76; B62D 5/06
[52] U.S. Cl. ................... 364/424.05; 364/424.01; 364/426.02; 180/140; 180/141; 180/142; 180/234; 180/236; 180/79.1
[58] Field of Search ............... 364/424.05, 426.02, 364/424.1; 180/140, 142, 79.1, 197, 233

[56] References Cited

U.S. PATENT DOCUMENTS

| | | | |
|---|---|---|---|
| 4,042,059 | 8/1977 | Bertolasi | 180/103 R |
| 4,651,290 | 3/1987 | Masaki et al. | 364/550 |
| 4,679,808 | 7/1987 | Ito et al. | 280/91 |
| 4,740,002 | 4/1988 | Miyoshi | 280/91 |
| 4,767,588 | 8/1988 | Ito | 364/424 |
| 4,828,061 | 5/1989 | Kimbrough et al. | 180/79.1 |
| 4,842,089 | 6/1989 | Kimbrough et al. | 180/79.1 |
| 4,874,056 | 10/1989 | Naito | 180/233 |
| 4,895,383 | 1/1990 | Abe et al. | 180/140 |
| 4,913,250 | 4/1990 | Emori et al. | 180/79.1 |
| 4,941,095 | 7/1990 | Imaseki et al. | 364/424.05 |
| 4,947,332 | 8/1990 | Ghoneim | 364/426.03 |
| 4,951,198 | 8/1990 | Watanabe et al. | 364/424.05 |
| 4,964,481 | 10/1990 | Sano et al. | 180/140 |
| 4,967,865 | 11/1990 | Schindler | 180/79.1 |
| 4,986,388 | 1/1991 | Matsuda | 180/248 |
| 4,989,686 | 2/1991 | Miller et al. | 180/197 |
| 5,002,147 | 3/1991 | Tezuka et al. | 180/197 |
| 5,010,971 | 4/1991 | Hamada et al. | 180/140 |
| 5,019,982 | 5/1991 | Furukawa | 364/424.05 |
| 5,035,295 | 7/1991 | Leiber et al. | 180/140 |
| 5,040,115 | 8/1991 | Fukushima et al. | 364/424.01 |
| 5,048,633 | 9/1991 | Takehara et al. | 180/197 |
| 5,088,040 | 2/1992 | Matsuda et al. | 364/424.05 |
| 5,099,940 | 3/1992 | Imaseki et al. | 180/140 |
| 5,103,925 | 4/1992 | Imaseki et al. | 180/140 |
| 5,116,254 | 5/1992 | Sano et al. | 180/140 |
| 5,119,298 | 6/1992 | Naito | 364/426.02 |
| 5,212,642 | 5/1993 | Tanaka et al. | 364/424.05 |
| 5,251,719 | 10/1993 | Eto et al. | 180/197 |

OTHER PUBLICATIONS

Matsumoto, N., Kuraoka, H., and Ohba, M., "An Experimental Study on Vehicle Lateral and Yaw Motion Control," IECON '91, pp. 113–118.

*Primary Examiner*—Kevin J. Teska
*Assistant Examiner*—Thai Phan
*Attorney, Agent, or Firm*—Raymond L. Coppiellie; Roger L. May

[57] ABSTRACT

Method, for use in a vehicle including a four wheel steering system and an electronic control unit having memory, of controlling the four wheel steering system while at least one of the wheels is under a torque load such that the vehicle behaves like a front wheel steering vehicle under no torque load, or a four wheel steering vehicle under no torque load. The method includes determining at least one control gain for the four wheel steering system so that the torque loaded vehicle behaves like a front wheel steering vehicle under no torque load, and controlling the four wheel steering system according to the control gain, thereby improving directional stability of the vehicle travelling on a slippery road surface. Apparatus is provided for carrying out the method.

9 Claims, 10 Drawing Sheets

5,488,555

METHOD AND APPARATUS FOR FOUR WHEEL STEERING CONTROL

TECHNICAL FIELD

The present invention relates to four wheel steering (4WS) and, more particularly, to a method and apparatus for a 4WS strategy for improving the directional behavior of a vehicle on slippery surfaces.

BACKGROUND ART

Recently, there has been significant research focusing on vehicular four wheel steering technology. A vehicle equipped with a four wheel steering system benefits from improved performance on almost any road surface over vehicles without such systems. Existing steering control systems are disclosed in U.S. Pat. Nos. 4,740,002, 5,035,295 and 5,048,633.

Even with an existing 4WS system, a vehicle can experience directional instability during accelerations and decelerations on slippery road surfaces (i.e. low μ road surfaces, such as snow). It would therefore be desirable to improve the handling of both front wheel drive and rear wheel drive cars on low μ road surfaces by combining traction control with a 4WS system. By doing so, lateral deviation error can be minimized, which would increase vehicle stability while performing certain maneuvers.

SUMMARY OF THE INVENTION

It is therefore an object of the present invention to provide a method and apparatus for improving directional behavior of a vehicle under accelerations and decelerations while travelling on slippery road surfaces.

In carrying out the above object and other objects and features of the present invention, there is provided a method, for use on a vehicle including a four wheel steering system and an electronic control unit having memory for controlling the four wheel steering system. The method comprises applying a torque load to at least one of the vehicle wheels and determining at least one control gain for the four wheel steering system so that the torque loaded vehicle behaves like a front wheel steering vehicle under no torque load. The method also comprises controlling the four wheel steering system according to a control gain, thereby improving directional stability of the vehicle travelling on a slippery road surface.

In the preferred embodiment, the step of determining at least one control gain comprises determining a yaw rate control gain based on vehicle stability requirements and determining a proportional steer control gain based on the yaw rate control gain. Most preferably, the proportional steer control gain $K_p$ for rear wheel drive vehicles is determined according to:

$$K_p = -\frac{uC_f(a+b)C_{r_n}}{(a+b)^2 C_f C_{r_n} - (aC_f - bC_{r_n})mu^2} K_{d\psi/dt} -$$

$$\frac{amu^2(C_{r_l} - C_{r_n})C_f}{C_{r_l}((a+b)^2 C_f C_{r_n} - (aC_f - bC_{r_n})mu^2)}$$

A method is also provided for determining the proportional steer control gain for front wheel drive vehicles.

The advantages of the present invention are numerous. For example, the present invention allows a 4WS torque loaded vehicle to emulate front wheel steering vehicle under a no-load condition, improving vehicle stability on slippery surfaces.

The above object and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
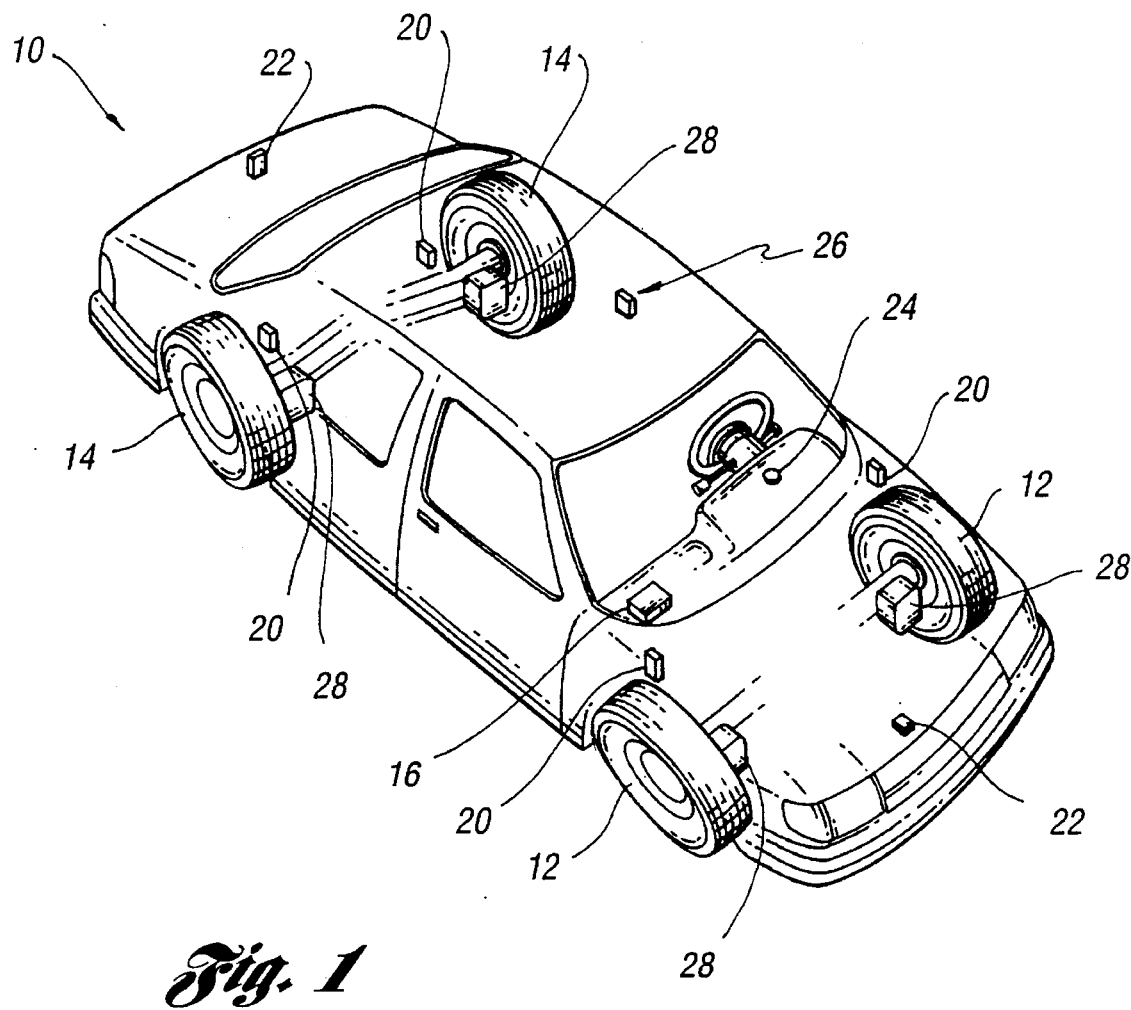
FIG. 1 is a perspective view of an automobile, including a 4WS system, for use with the present invention.

Referring now to FIG. 1, there is shown a perspective view of a vehicle, shown generally by reference numeral 10, for use with the method for 4WS of the present invention. As shown, the vehicle 10 includes a pair of front steerable wheels 12 each having a tire, a pair of rear steerable wheels 14 each having a tire, and an electronic control module (ECM) 16 including RAM and ROM memories, which executes the control strategy of the present invention. To do so, the ECM 16 receives input signals from a plurality of sensors, such as wheel speed sensors 20, lateral acceleration sensors 22 and a steering angle sensor 24. Based on the signals from the wheel speed sensors 20, individual tire slip can be determined in a known manner. A yaw sensor 26 that would be incorporated in ECM 16 may be utilized in place of the lateral acceleration sensors 22. Electrical connections between the various sensors and the ECM 16 are not shown for the sake of clarity. Based on data from these sensors, the ECM controls four wheel steering hardware, such as the motors or actuators 28, thereby steering the front steerable wheels 12 and rear steerable wheels 14.

To find the proper control method of the rear wheel steer angle under real world operating conditions, it is desirable to dynamically examine the processes by which the delay of lateral acceleration response decreases due to steering of the rear steerable wheels 14. By examining the attitude of the vehicle 10 during steady state circular turning, one can comprehend physically the difference in vehicle response characteristics between high speed maneuvers and low speed maneuvers.

The path of the vehicle 10 at low speeds (e.g. below approximately 10 miles per hour) is relatively easy to analyze. Since lateral tire forces are small, slip angles are negligible. It is therefore correct to assume that each of the front steerable wheels 12 and the rear steerable wheels 14 roll in a direction generally perpendicular to the axis of wheel rotation. For a normal front wheel steering (FWS) vehicle, this means that the center of the turning circle is along the extended rear axle line.

The path of the vehicle 10 at high speeds (e.g. above approximately 10 miles per hour) is more difficult to analyze, since the front and rear tires will slip at angles $\alpha_f$ and $\alpha_r$, respectively. As a result, the center of gravity of the vehicle 10 slips at an angle $\beta$, commonly referred to as the body side slip angle. As the vehicle speed increases, greater centripetal force (i.e. the force required to keep the vehicle 10 in a circular path) has to be generated, which in turn increases the body side slip angle. At a certain vehicle velocity, $\beta=0$, i.e. the circular orientation and the direction in which the center of gravity moves coincide.

If the driver makes a step steering input during straight ahead driving, a series of motions occur and the vehicle 10 begins turning. These can be chronologically summarized as follows: driver's steering input; slip angle at front tires; lateral force on front tires; vehicle rotation about vehicle center of gravity; vehicle side slip angle; slip angle at rear tires; lateral force on rear tires; and centripetal force by front and rear tires resulting in vehicle turn. These vehicle motions can be divided into two parts. One is the rotation around the vehicle center of gravity, which occurs in the early stages of entire motion due to the lateral force generated by the front steerable wheels 12. The other is the revolution about the turning center.

The vehicle rotation around the center of gravity corresponds to yaw responses, while the revolution around the turning center corresponds to lateral acceleration responses. Before settling down to steady-state revolution, the vehicle 10 has to rotate around the center of gravity and give its body a side angle to make the rear steerable wheels 14 generate a lateral force. Generally, when considering the side slip angle in both the front steerable wheels 12 and the rear steerable wheels 14 generated by a step input in front steer angle, only the front tires are involved in controlling the side slip angle needed for cornering. The rear tires generate the cornering force only by the side slip angle resulting from vehicle motion. The rear tires are not directly involved in controlling the course of the vehicle 10.

As soon as the front steerable wheels 12 are steered, the front tires generate a cornering force which causes the vehicle to yaw (i.e. rotate about the vertical axis), while at the same time the cornering force in the rear tires is zero. Gradually, the cornering force at the rear tires increases to about the same value as that of front tires. In a steady-state turn, a higher vehicle speed involves a larger vehicle side slip angle and therefore the delay in lateral acceleration response increases more.

One feasible way of reducing this delay is to make a high performance tire that can produce a high lateral force with a small side slip angle, and to improve the suspension system in such a manner that the tire performance will be kept to work efficiently. One of ordinary skill in the art will realize, however, that the improvements in vehicle handling offered by either of these ways is limited because vehicle ride and other performances are also affected.

Another possible approach, conceived from an entirely different viewpoint, is to change the very mechanism of lateral force generation in the rear steerable wheels 14. The result is a 4WS system which allows both the front steerable wheels 12 and the rear steerable wheels 14 to directly steer the vehicle 10 to control the side slip angle. Steering the rear steerable wheels 14 could help not only reduce a delay in the generation of cornering force, but also permit the vehicle path and attitude (i.e. the body side slip angle) to be controlled independently of each other. Making the most of this characteristic would therefore decrease the required motion of the vehicle body around the vertical axis and offer better responsiveness during a change in vehicle course.

In the preferred embodiment, the present invention utilizes a vehicle model obtained by combining a 2D nonlinear bicycle model with a nonlinear tire model, an aerodynamic force model and a driver model, each of which is described in greater detail below. The 2D nonlinear bicycle model is formed by joining the center of a front steerable wheel and the center of a rear steerable wheel into one on the center of the body. This model is useful for handling dynamics studies, and can be used to study the lateral/yaw dynamics of vehicles subject to front and possibly rear wheel steering inputs. Because of the nonlinear tire model, the vehicle model is capable of simulating large body side slip angles.

Figure 2:
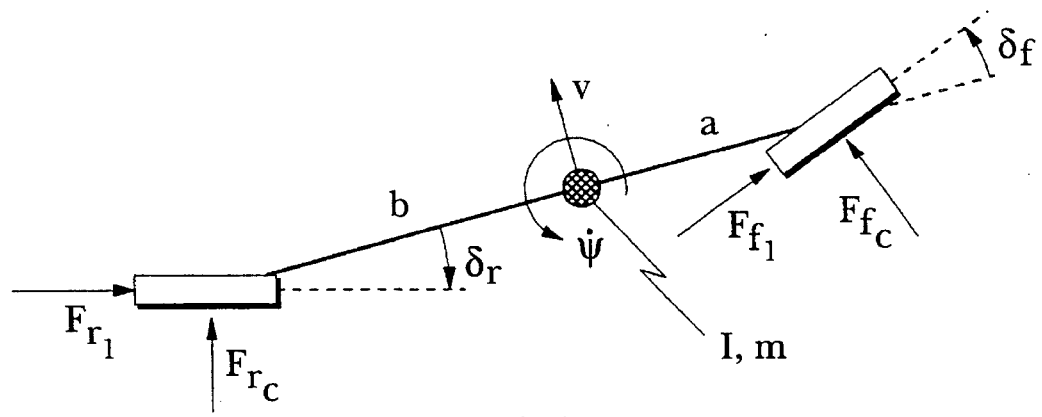
FIG. 2 is a free body diagram of a bicycle model utilized to develop a vehicle model for use with the present invention.

Referring now to FIG. 2, there is shown a free body diagram of the 2D bicycle model utilized by the present invention. The bicycle model preferably has two degrees of freedom: lateral velocity (v), and yaw rate ($d\psi/dt$). With reference to FIG. 2, the term "a" represents the distance from the center of gravity to the front steerable wheel 12, and the term "b" represents the distance from the center of gravity to the rear steerable wheel 14. The term "m" represents body mass and I represents the body moment of inertia about the vertical axis through the center of gravity. The command input variables are the steering angles of front steerable wheels 12 and the rear steerable wheels, $\delta_f$ and $\delta_r$, respectively. The forces $F_{fl}$ and $F_{fc}$ represent the lateral tire force and the centripetal force, respectively, associated with the front steerable wheel 12, and the forces $F_{rl}$, $F_{rc}$ represent the lateral tire force and the centripetal force, respectively, associated with the rear steerable wheel 14. The body moves as a result of forces transmitted from the road through the tires on the wheels 12 and 14.

In this model, the longitudinal velocity is assumed to be constant. Provision is made to set the front and rear wheels %slip to desired values. This means that it has been assumed that the vehicle 10 is on a grade so that it compensates the longitudinal forces, such as those due to grades, aerodynamic drag, or and vehicle rolling resistance, to name a few.

For purposes of the present invention, the equations of motion for the bicycle model are:

$$m\left(\dot{v} + u\frac{d\psi}{dt}\right) = F_{c_f}\cos\delta_f + F_{c_r}\cos\delta_r + F_{l_f}\sin\delta_f + F_{l_r}\sin\delta_r + F_w$$

$$I\frac{d\psi}{dt} = aF_{c_f}\cos\delta_f - bF_{c_r}\cos\delta_r + aF_{l_f}\sin\delta_f - bF_{l_r}\sin\delta_r + M_w$$

$M_w$ and $F_w$ are the wind moment and force, respectively. The tractive and cornering force, $F_l$ and $F_c$, are functions of tire side slip angle ($\alpha$), vertical load ($F_z$), and percent slip (s):

$$F_l = F_l(\alpha, s, F_z)$$

$$F_c = F_c(\alpha, s, F_z)$$

The percent slip is calculated by:

$$\% \text{ Slip} = \frac{R\omega - u}{u} * 100\%$$

when braking, and $$\% \text{ Slip} = \frac{R\omega - u}{R\omega} * 100\%$$

when accelerating, where u is the longitudinal velocity of center of tire, $\omega$ is angular velocity of tire, and R is the instantaneous tire radius.

The tire slip angle ($\alpha$) is the angle between the plane of the tire and the direction in which the tire travels. The side slip angles are calculated by:

$$\alpha_f = \delta_f - \tan^{-1}\left(\frac{v + \frac{d\psi}{dt}a}{u}\right)$$

and $$\alpha_r = \delta_r - \tan^{-1}\left(\frac{v - \frac{d\psi}{dt}b}{u}\right)$$

As previously mentioned, the vehicle model utilized by the present invention is based on a tire model. The preferred tire model is a nonlinear tire model, such as that disclosed in the article titled "Analytical Modeling of Driver Response in Crash Avoidance Maneuvering—Volume 2: An Interactive Tire Model For Driver/Vehicle Simulation", National Highway Traffic Safety Administration, DOT HS 807 271, published in 1988. This nonlinear tire model not only takes into consideration the interaction between both longitudinal and lateral forces in combined accelerating and cornering, but also considers the effects of surface friction. The basic equations of this tire model in SI units, taken from Table B-1 of the above-noted publication, are as follows: Composite slip is determined from:

$$\sigma = \frac{\pi a_p^2}{8\mu_0 F_z}\sqrt{K_S^2\tan^2\alpha + K_c^2\left(\frac{S}{1-S}\right)^2}$$

and the force saturation function is:

$$f(\sigma) = F_c/\mu F_z = \frac{c_1\sigma^3 + c_2\sigma^2 + (4/\pi)\sigma}{c_1 + c_3\sigma^2 + c_4\sigma + 1}$$

Normalized side force can be represented as:

$$F_c/\mu F_z = \frac{f(\sigma)K_s\tan\alpha}{\sqrt{K_S^2\tan^2\alpha + K_c'^2 S^2}} + Y_\gamma\gamma$$

and normalized longitudinal force is found from:

$$F_l/\mu F_z = \frac{-f(\sigma)K_c'S}{\sqrt{k_S^2\tan^2\alpha + K_c'S^2}}$$

Slip to slide transition is determined from:

$$K_c' = K_c + (K_s - K_c)\sqrt{\sin^2\alpha + S^2\cos^2\alpha}$$

$$\mu = \mu_0(1 - K_\mu\sqrt{\sin^2\alpha + S^2\cos^2\alpha})$$

The parameter variations with load equations, taken from Table B-2 of the above-noted publication, are as follows: the lateral stiffness coefficient can be represented as:

$$K_S = \frac{2}{a_{p0}^2}\left(A_0 + A_1F_z - \frac{A_1}{A_2}F_z^2\right)$$

The longitudinal stiffness coefficient is found from:

$$K_c = \frac{2}{a_{p0}^2} * F_z(CS/FZ)$$

and camber thrust stiffness from:

$$Y_{\gamma_0} = A_3 F_z - \frac{A_3}{A_4}F_x^2$$

The aligning torque coefficient is determined from:

$$K_m = K_1 F_z$$

whereas the peak tire/road coefficient of friction is determined from:

$$\mu_0 = (B_1 F_z + B_3 + B_4 F_z^2)\frac{SN_0}{SN_T}$$

where $SN_T = 85$ (test skid number). Tire contact patch length is represented by:

$$S_p = s_{po}\left(1 - K_a\frac{F_x}{F_z}\right)$$

where $$a_{po} = .0768\frac{\sqrt{F_z * F_{ZT}}}{T_w(T_p + 5)}$$

and $F_{ZT}$=tire design load at operating pressure (lbs), $T_w$=tread width (inches), and $T_p$=tire pressure (psi).

Since aerodynamic resistance and pitching moment of the vehicle have significant effects on vehicle performance at both moderate and high speeds, the vehicle model utilized by the present invention is also based on an aerodynamic model. Use of an aerodynamic model also permits simulation of real-life vehicle situations, such as the existence high head winds or side winds.

The derivation of equations of the wind cornering force ($F_w$) and moment ($M_w$) follows. If wind is blowing at the speed of V at an angle $\gamma$ with respect to inertial fixed axes X and Y, the corresponding wind velocity in the inertial axis, X and Y, is:

$$V_{w_x} = V_w \cos\gamma$$

$$V_{w_y} = V_w \sin\gamma$$

Transforming these velocities into a vehicle body moving frame (by coordinate transformation) yields:

$$V_{w_x} = V_{w_x}\cos\psi + V_{w_y}\sin\psi$$

$$V_{w_y} = -V_{w_x}\sin\psi + V_{w_y}\cos\psi$$

Assuming the vehicle is traveling at a speed of u and V and also has a yaw motion at the rate of $d\psi/dt$, the relative velocity ($V_r$) is:

$$V_{r_y} = V_{w_y} - \left(V + d_y \frac{d\psi}{dt}\right)$$

wherein $d_y$ is the distance between the center of gravity (c.g.) and the geometric center of the vehicle (positive if ahead of the c.g.). The aerodynamic side force ($F_w$) and yawing moment ($M_w$) are functions of $\beta = \tan^{-1}(V_{r_y}/V_{r_x})$ and $v_r^2$. Actual functional dependence may be based on the FRESH aerodynamic model described in the "Fresh Handling Simulation User's Manual (1986)."

Figures 3, 4A:
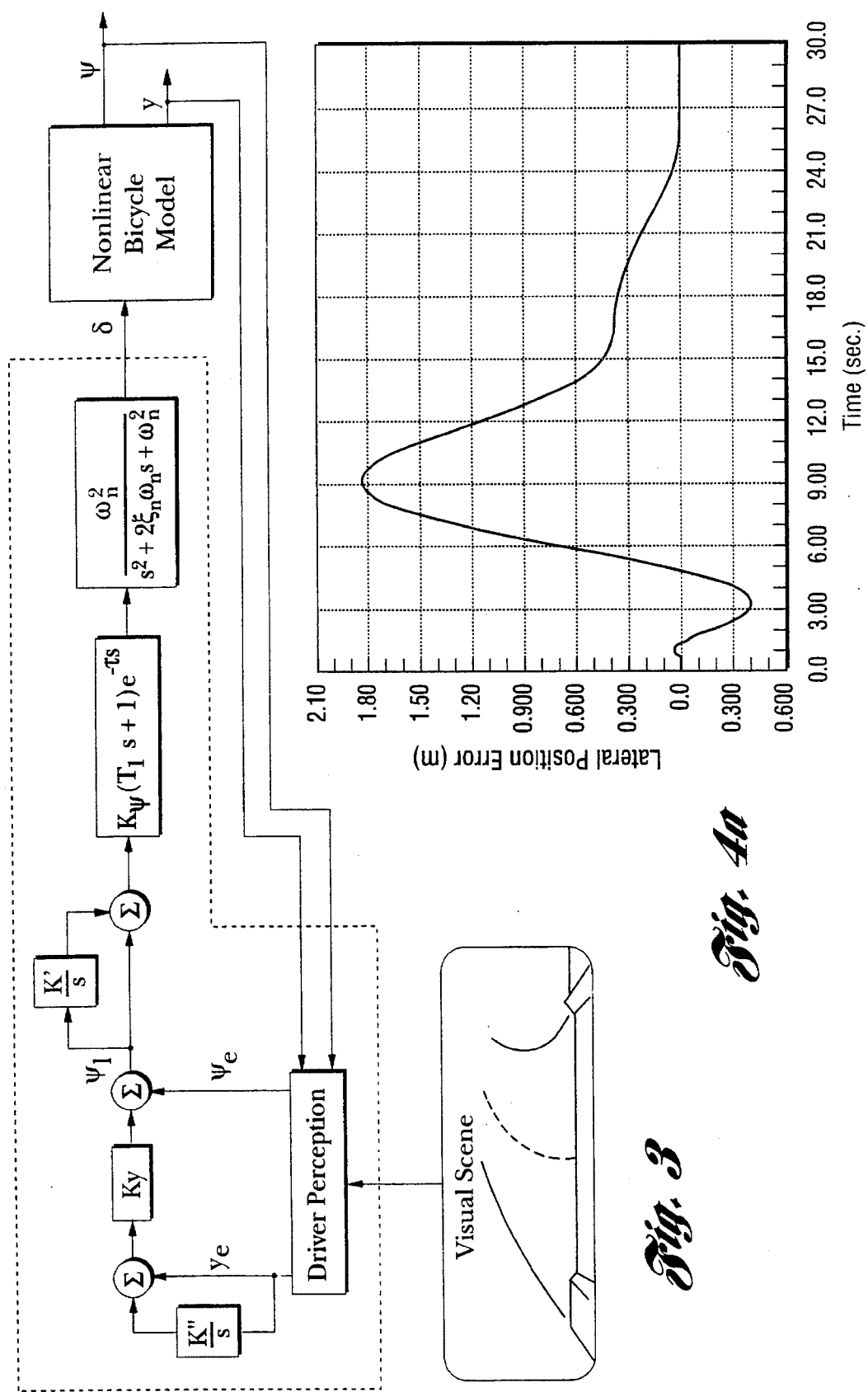
FIG. 3 is a block diagram representation of a driver model for use with the present invention.
FIGS. 4a–4b are graphical illustrations of lateral position and heading error, respectively, of a 4WS vehicle with only yaw rate feedback executing a steady-state turn with tire slip.

The vehicle model utilized with the present invention is also based on a driver model, a block diagram of which is shown in FIG. 3. As shown, in the preferred embodiment, the driver model consists of an open-loop, or pursuit, portion and a feedback, or compensatory, portion. The open-loop feed-forward control permits the driver to anticipate the desired path. In precision path following, the driver steering motions are functions of errors or vehicle output motions.

With continuing reference to FIG. 3, the outputs from the vehicle dynamics block (i.e. the nonlinear bicycle model) are yaw, longitudinal position of the car and lateral position of the car. These outputs are compared with the desired positions (depending on desired path) to give the lateral position error ($Y_e$) and yaw error ($\psi_e$). These errors go through the specified blocks to give the desired steering angle, $\delta_f$, used in the bicycle model equations of motion described above.

When the vehicle is under a no-load condition (i.e. no torque is applied to the wheels from the drivetrain), improvements associated with a 4WS system highly depend on vehicle properties. During harsh maneuvers, such as a panic lane change, the required cornering force for maneuvering is usually much larger than the available cornering force (depending on the vehicle speed), and the driver usually saturates the tire cornering forces. More specifically, in a panic maneuver the rear side slip angle of a FWS vehicle increases, causing the rear tire to saturate significantly beyond the front tire saturation, resulting in an increased heading error and vehicle instability. For example, consider a vehicle performing a panic maneuver on a $\mu=0.3$ road surface at speeds of 15 m/S and 18 m/S, depending on the vehicle. Although the vehicle may be able to complete the maneuver at 15 m/S, the increase in rear side slip at 18 m/S is big enough to cause vehicle instability, especially during the second portion or last half of the maneuver.

FWS vehicle instability arises from the loss in cornering force of the rear tires during harsh maneuvers, which also results in increased heading error. To minimize this heading error, optimizations using 4WS systems can be performed under similar driving conditions as above ($\mu=0.3$, $v=15$ m/S). These optimizations could be performed with an appropriate control design and modelling software package, such as MatrixX, commercially available from Integrated Systems Incorporated of Santa Clara, Calif., United States of America. Based on appropriate supplied inputs, MatrixX executes the overall vehicle model described above in search of the best control gains to minimize an error, such as heading error. In one instance, a proportional rear steer system can be utilized (wherein the rear steerable wheels are turned proportional to the front steerable wheels and $\delta_r = K_p \delta_f$). In another instance, a combination proportional rear steer with yaw rate feedback system (wherein $\delta_r = K_p \delta_f + K_{104} d\psi/dt$) can be utilized.

For the former system, a proportional control gain was found to be $K_p = 0.1892$, and for the latter system, the proportional and yaw rate control gains were found by the present invention to be $K_p = 0.2382$ and $K_{d\psi/dt} = 0.1372$, respectively. Utilizing these control gains, the 4WS vehicle will exhibit vehicle performance over a conventional FWS vehicle. It should be appreciated that the actual values of the gains vary from vehicle to vehicle. More specifically, the addition of 4WS to a no-load vehicle has very little effect during the first half of the panic lane change, but it highly damps the performance during the second half of the panic lane change, causing the vehicle to follow the commanded path in a much smoother manner. Although lateral deviation path was not improved much, 4WS highly improved the heading error.

Comparing the two 4WS systems, very small improvement is noticeable by the addition of yaw rate feedback. It should be appreciated that any reasonable positive gain for $K_p$, or any reasonable negative $K_p$ and positive $K_{d\psi/dt}$ in the second case can improve performance. As a result, the vehicle can follow a commanded path at higher speeds (e.g. 21 m/S for proportional only, and 22 m/S for proportional plus yaw rate feedback). Vehicle stability at higher speeds is possible by further increasing the control gains. Results based on control gains determined for smooth maneuvers indicate that 4WS on a no-load vehicle does not significantly improve handling performance over traditional FWS no-load vehicles.

Driving with a rear wheel drive vehicle under load on a low $\mu$ road surface, such as snow, can easily cause instability, such as fishtailing. For example, some vehicles may be unstable for a rear tire slip which exceeds 5% on a snow covered road surface with a vehicle speed of about 15 m/S. As the slip of the rear tires increases, less steering angle (i.e. oversteer) and larger rear side slip angle with the same front side slip angle is required to negotiate the same curve. Increasing the percent tire slip of the rear also causes the cornering stiffness of the rear to decrease, while the cornering stiffness of the front remains the generally constant.

Therefore, to improve the stability of a vehicle, traction control could be used to reduce percent slip below the instability limit. In the alternative, a 4WS system could be implemented in which yaw rate feedback is one of its control parameters. In the preferred embodiment, the present invention is for use on a vehicle which combines both 4WS and traction control to improve the directional behavior of a vehicle on slippery surfaces.

Figure 4B:
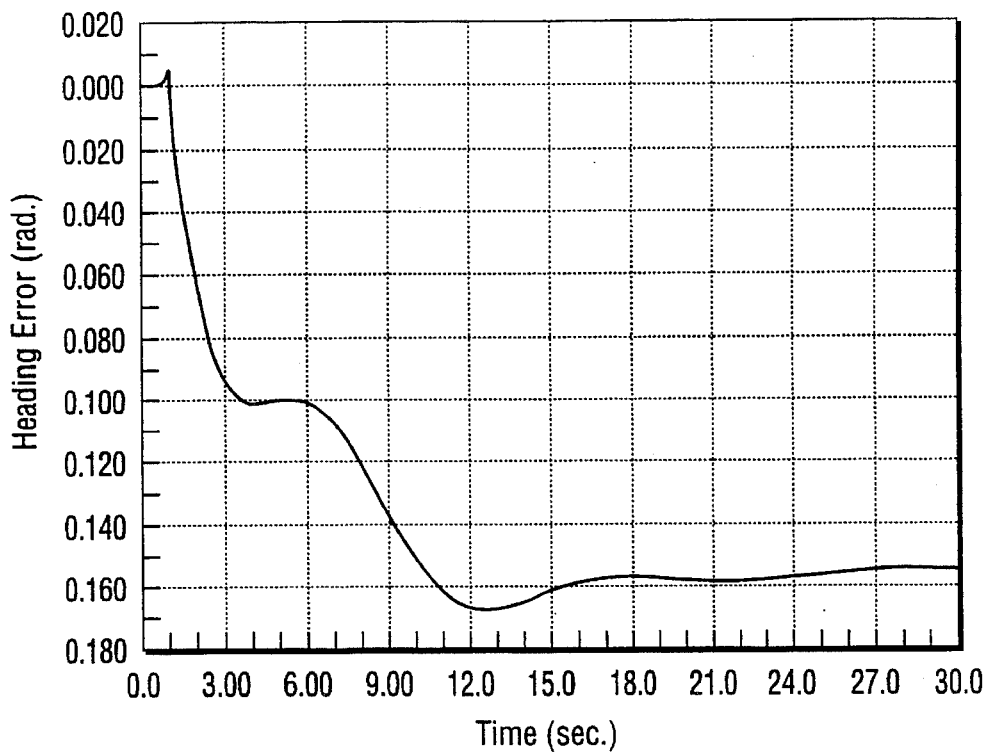

The goal for designing a control strategy for a RWD vehicle under load (i.e. while there is some torque load on the rear wheels) is to stabilize the system. This requirement could be achieved by using only yaw rate feedback. FIGS. 4a–4b illustrate the lateral position and heading error, respectively, of a 4WS ($\delta_r = 2.0 d\psi/dt$) vehicle with only yaw rate feedback executing a steady-state turn of radius 150 m with 25% tire slip in the rear. Although 4WS stabilizes the system, the response is not satisfactory, since lateral deviation error and heading error are large.

Another goal for 4WS can be set by requiring the 4WS vehicle with some percent slip on the rear tires to behave like a FWS vehicle under a no-load condition, at least for steady state operations, although a RWD vehicle is generally unable to behave like a no-load FWS vehicle in harsh maneuvers and maneuvers which exceed the limited cornering capability at the rear. Preferably, it can be required that RWD vehicles have a steady-state yaw rate which corresponds to the no-load FWS yaw rate. Assuming steady-state yaw rate is described by:

$$\left. \frac{\Delta \Psi}{\Delta \delta_f} \right| = \frac{(a+b)(1-K_p)C_fC_r}{\frac{(a+b)^2 C_f C_r}{u} + K_{d\psi/dt}(a+b)C_fC_r - (aC_f - bC_r)mu} \quad (1)$$

The desired yaw rate associated with a FWS vehicle under no-load (NL) can be found using Equation (1) by setting $K_p$ and $K_{d\psi/dt}$ to zero and using $C_f$ and $C_r$ for the no-load case at zero slip angle, i.e., $$\Psi_d = \left. \frac{(a+b)C_fC_{r_n}}{\frac{(a+b)^2 C_f C_r}{u} - (aC_f - bC_r)mu} \right|_{NL} \quad (2)$$

For a rear wheel drive vehicle under load, desired yaw rate is:

$$\Psi_d = \quad (3)$$

$$\left. \frac{(a+b)(1-K_p)C_fC_r}{\frac{(a+b)^2 C_f C_{r_l}}{u} + (K_{d\psi/dt}(a+b)C_fC_{r_l} - (aC_f - bC_{r_l})mu} \right|_{RWD}$$

Manipulating Equation (3) and solving for control $K_p$ yields:

$$K_p = 1 - \psi_d \left( \frac{a+b}{u} - \frac{(aC_f - bC_r)mu}{(a+b)C_fC_r} \right) - \psi_d \frac{K_{d\psi}}{dt} \quad (4)$$

which shows that $K_p$ is a linear function of $K_{d\psi/dt}$. The slope is independent of %slip; only the y-intercept is a function of %slip.

Figure 5:
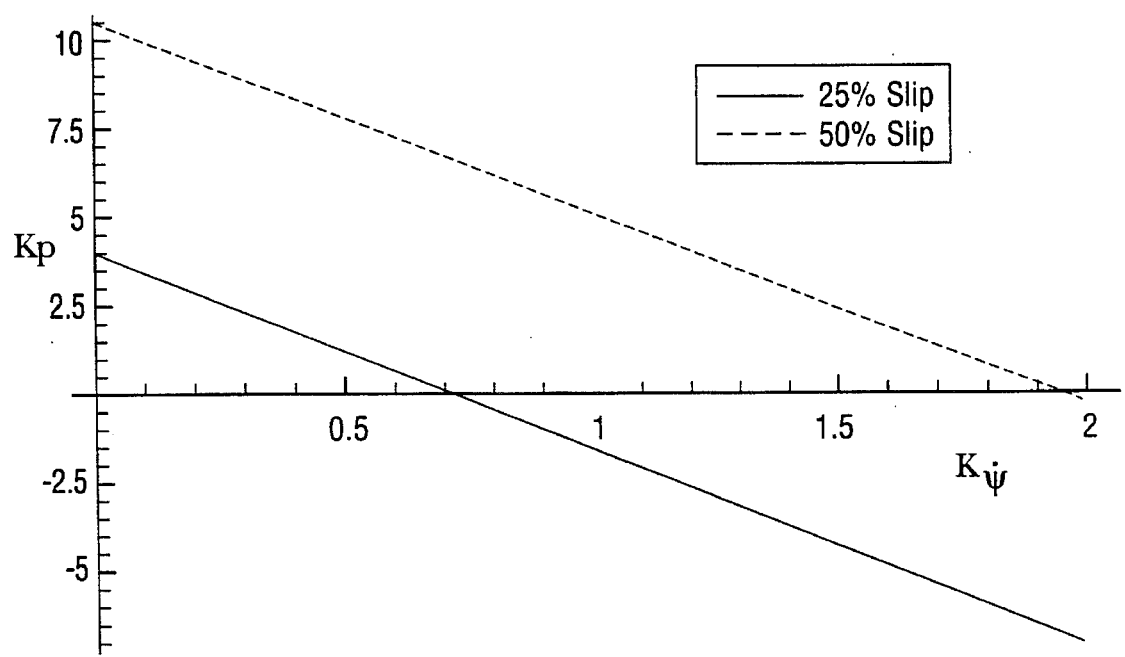
FIG. 5 is a graphical illustration of the change in proportional gain ($K_p$) as a function of yaw rate feedback gain ($K_{d\psi/dt}$) in a 4WS/RWD vehicle with a particular tire slip, as determined by the present invention.

FIG. 5 is a graphical illustration of the change in proportional gain ($K_p$) as a function of yaw rate feedback gain ($K_{d\psi/dt}$) in a 4WS/RWD vehicle for 25% slip and 50% slip.

It would also be desirable to require the RWD vehicle to have a lateral velocity corresponding to a FWS vehicle under no-load. Assuming steady-state lateral velocity is represented by:

$$\left. \frac{v}{\delta_f} \right| = \frac{(K_p a + b + K_{d\psi/dt})(a+b)C_fC_r - mu^2(aC_f - bK_pC_r)}{\frac{(a+b)^2 C_f C_r}{u} + K_{d\psi/dt}(a+b)C_fC_r - (aC_f - bC_r)mu} \quad (5)$$

the desired lateral velocity associated with a FWS vehicle under no-load can be found using Equation (5) by setting $K_p$ and $K_{d\psi/dt}$ to zero and using $C_f$ and $C_r$ for the no-load case at zero slip angle, i.e.

$$v_d \equiv \left. \frac{b(a+b)C_fC_{r_n} - mu^2 aC_f}{\frac{(a+b)^2 C_f C_{r_n}}{u} - (aC_f - bC_{r_n})mu} \right| \quad (6)$$

In a RWD vehicle under load:

$$v_d \equiv \quad (7)$$

$$\left. \frac{(K_p a + b + uK_{d\psi})(a+b)C_fC_{r_l} - mu^2(aC_f - bK_pC_r)}{\frac{(a+b)^2 C_f C_{r_l}}{u} + K_{d\psi/dt}(a+b)C_fC_{r_l} - (aC_f - bC_{r_l})mu} \right|_{RWD}$$

or $$K_p = \frac{(-u + v_d)(a+b)C_f}{a(a+b)C_f + mu^2 b} K_{d\psi/dt} + \quad (8)$$

$$\frac{b(a+b)C_fC_{r_l} + mu^2 aC_f + \frac{v_d}{u}(a+b)^2 C_f C_{r_l} - \frac{v_d}{u}(aC_f - bC_{r_l})m}{(a(a+b)C_f + mu^2 b)C_{r_l}}$$

Even though equations (4) and (8) appear to be significantly different, substituting Equation (2) for $\psi_d$ into Equation (4), and substituting Equation (6) for $v_d$ into Equation (8), yields:

$$K_p = -\frac{uC_f(a+b)C_{r_n}}{(a+b)^2 C_f C_{r_n} - (aC_f - bC_{r_n})mu^2} K_{d\psi/dt} - \quad (9)$$

$$\frac{amu^2(C_{r_l} - C_{r_n})C_f}{C_{r_l}((a+b)^2 C_f C_{r_n} - (aC_f - bC_{r_n})mu^2)}$$

where $C_{r_n}$ is the rear cornering coefficient when there is no torque load on the tires, such as in Equations (1), (2) (5), and (6), and wherein $C_{r_l}$ is the rear cornering coefficient when there is a torque load on the tires, such as in Equations (3) and (7). This relationship between $K_p$ and $K_{d\psi/dt}$ expressed by Equation (9) is shown graphically in FIG. 5. It should be appreciated that this result suggests that in RWD vehicles, it is possible to control or at least influence the lateral velocity by controlling the yaw rate $d\psi/dt$ and conversely to control or at least influence the yaw rate by controlling lateral velocity.

It should be appreciated that the relationship between $K_p$ and $K_{d\psi/dt}$, as expressed in Equation (9), has many uses. For example, after estimating a good $K_{d\psi/dt}$ based on intuition and the desired stability of the vehicle, Equation (9) provides an associated $K_p$. Thus, a table of control gains can be realized for various amounts of tire spin and stored in a ROM or similar memory device within the vehicle ECM 16. Once the actual tire slip is obtained from the wheel speed sensors, appropriate control gains can be determined. The rear wheels can then be steered based on $K_{d\psi/dt}$ and front tire angle. As the tire slip changes, new control gains are obtained and the rear wheels are steered accordingly.

Figure 6A:
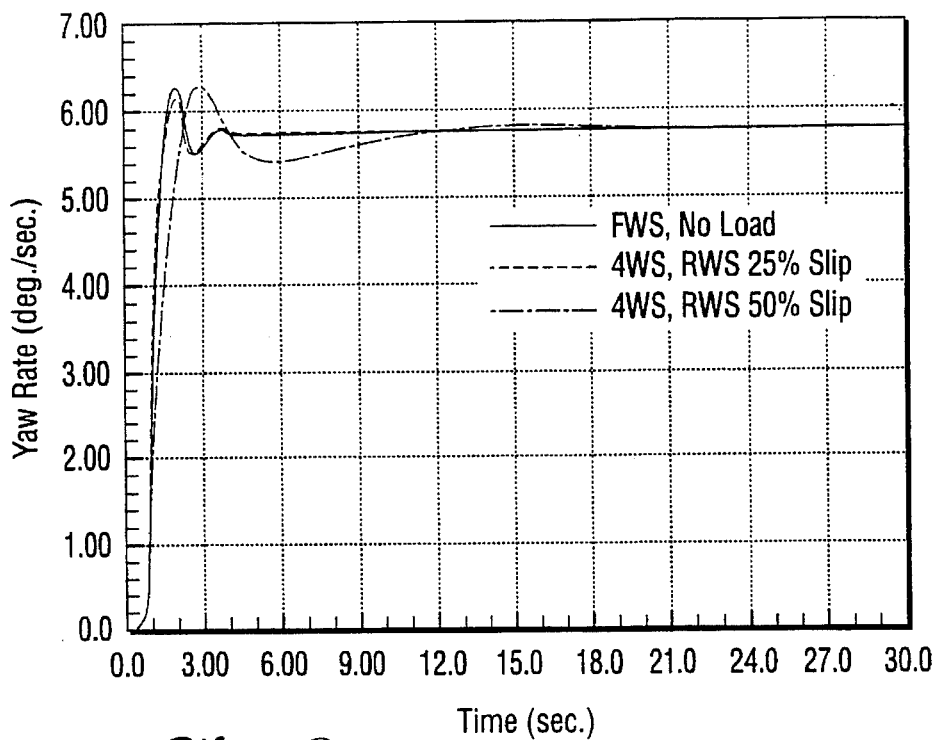
FIGS. 6a–6b are graphical illustrations comparing the yaw rate and lateral acceleration, respectively, of FWS no-load vehicles to that of 4WS/RWD loaded vehicles steered according to the present invention.
Figure 6B:
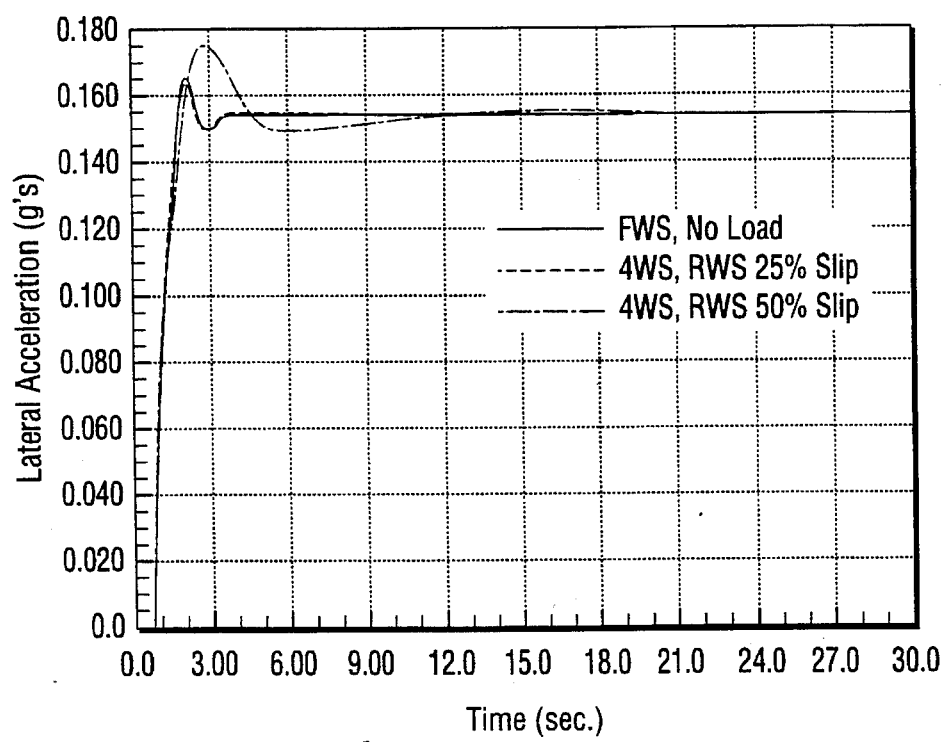

With reference now to FIGS. 6a and 6b, there are shown graphical illustrations comparing the yaw rate and lateral acceleration, respectively, of FWS no-load vehicles to that of 4WS/RWD loaded vehicles. Once the control gains $K_p$ and $K_{d\psi/dt}$ are obtained, the overall vehicle model described above generates the yaw rate and lateral acceleration. Each of the graphs includes three traces: one represents the FWS vehicle with no torque load on tires which is cruising along a 150 m radius curve at a speed of about 15 m/S and on a road surface having a coefficient of friction μ=0.3; the second trace represents a 4WS/RWD vehicle going through the same curve with 25% slip on the rear and with control gains $K_p$=−6.8 and $K_{d\psi/dt}$=2; and the third trace represents a 4WS/RWD vehicle going through the same curve with 50% slip and $K_p$=−0.28 and $K_{d\psi/dt}$=2. It should be noted that the $K_p$ gains for the two 4WS vehicle were found utilizing FIG. 5 (at $K_{d\psi/dt}$=2). It should be appreciated that these results indicate that use of the present invention will significantly improve the performance of RWD vehicles in certain maneuvers on low μ road surfaces. As shown, the 4WS/RWD loaded vehicle under 25% slip performed nearly identically to the FWS no load vehicle. It should be noted that the rear wheel steer angle in 4WS/RWD in the simulation shown is much higher than front wheel angle, although in practice it is expected that tire spin will be controlled by an appropriate traction control strategy and system to below 25%, so that the maximum rear steer angle would be limited to no more than 4°–5°.

Figure 6C:
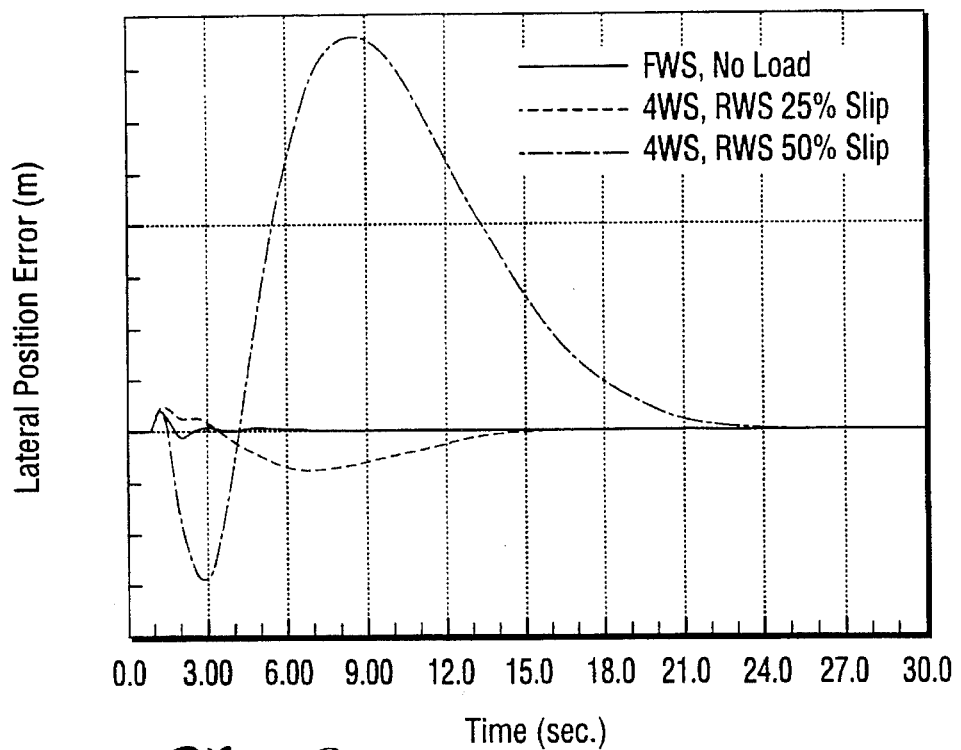
FIGS. 6c–6d are graphical illustrations of lateral position error and heading error, respectively, of FWS no-load vehicles to that of 4WS/RWD loaded vehicles.
Figure 6D:
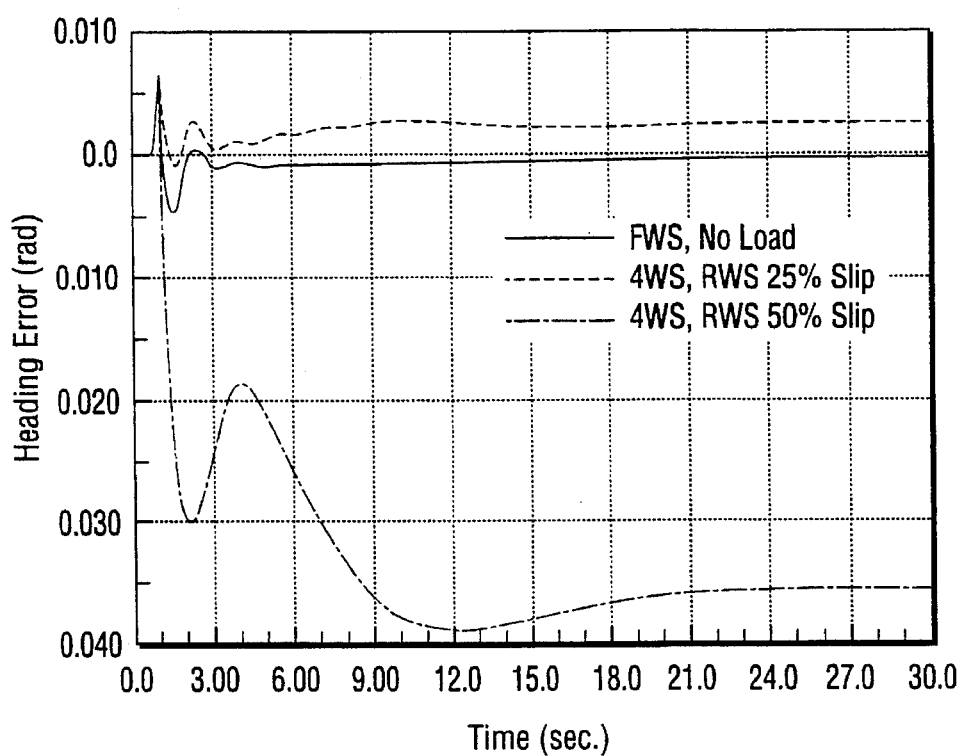

Referring now to FIGS. 6c–6d, there is shown graphs illustrating the lateral position error and heading error, respectively, of FWS no-load vehicles to that of 4WS/RWD loaded vehicles. The traces represent the same vehicles depicted in FIGS. 6a–6b. Again, the graphs clearly indicate that the 4WS/RWD loaded vehicle under 25% slip behaved similarly to the FWS no-load vehicle. For further evidence of the results obtainable by the present invention which utilizes both proportional control and yaw rate feedback, FIGS. 6c–6d should be compared to FIGS. 4a–4b, which illustrate the lateral position and heading error, respectively, of a 4WS ($\delta_r$=2.0dψ/dt) vehicle with only yaw rate feedback executing a steady-state turn of radius 150 m with 25% tire slip.

To verify the applicability of the present invention, the 4WS/RWD vehicle at 25% slip was optimized for the lateral deviation error utilizing the MatrixX program described above. The gains were found to be $K_{d\psi/dt}$–2.69 and $K_p$=–9.97. Comparing these result with FIG. 5, it follows that these gains are very close to the expected values. As a result, it is clear that Equation (9) can be used for determination of control gains for 4WS/RWD control strategy.

Within the assumption of the present models, front wheel drive vehicles are generally always stable. The vehicle dynamic poles approach the imaginary axis, causing a less damped, but still stable, system. As the percent of the front tires increases, larger steering angles (i.e. understeer) and front side slip angles should be provided while the rear side slip angle remains the generally constant, to negotiate the same curve. Increasing the percent slip of the front also causes the cornering stiffness of the front to decrease, while the cornering stiffness of the rear remains the same. This suggests that as the percent tire slip increases, the driver eventually will lose the control of the vehicle.

The control strategy for 4WS/FWD vehicles can be designed utilizing the same approach utilized for 4WS/RWD vehicles. Here, it is proposed that 4WS/FWD vehicles behave like FWS, no-load vehicles at the steady-state condition. To emulate the same desired steady-state yaw rate in the 4WS/FWD vehicle, we need:

$$\Psi_d = \left. \frac{(a+b)(1-K_p)C_f C_r}{\frac{(a+b)^2 C_f C_r}{u} + K\frac{d\psi}{dt}(a+b)C_f C_r - (aC_{f_l}-bC_r)mu} \right|_{FWD} \quad (10)$$

Substituting $\psi_d$ from Equation (2) and manipulating yields:

$$K_p = -\frac{uC_r(a+b)C_{f_n}}{(a+b)^2 C_r C_{f_n} - (aC_{f_n}-bC_r)mu^2} K\frac{d\psi}{dt} - \frac{bmu^2(-C_{f_l}+C_{f_n})C_r}{C_{f_l}((a+b)^2 C_r C_{f_n} - (aC_{f_n}-bC_r))mu^2} \quad (11)$$

$C_{f_n}$ and $C_{f_l}$ are cornering coefficients at the front for no-load and loaded conditions, respectively. Using the same argument for lateral velocity rather than yaw rate yields:

$$K_p = -\frac{uC_rC_{f_l}(a+b)\{a(a+b)C_{f_n}+bmu^2\}}{\{a(a+b)C_{f_l}+bmu^2\}\{(a+b)^2 C_r C_{f_n} - (aC_{f_n}-bC_r)mu^2\}} K\frac{d\psi}{dt} - \frac{bmu^2(C_{f_l}-C_{f_n})\{b(a+b)C_r - amu^2\}}{\{a(a+b)C_{f_l}+bmu^2\}\{(a+b)^2 C_r C_{f_n} - (aC_{f_n}-bC_r)mu^2\}} \quad (12)$$

Figure 7A:
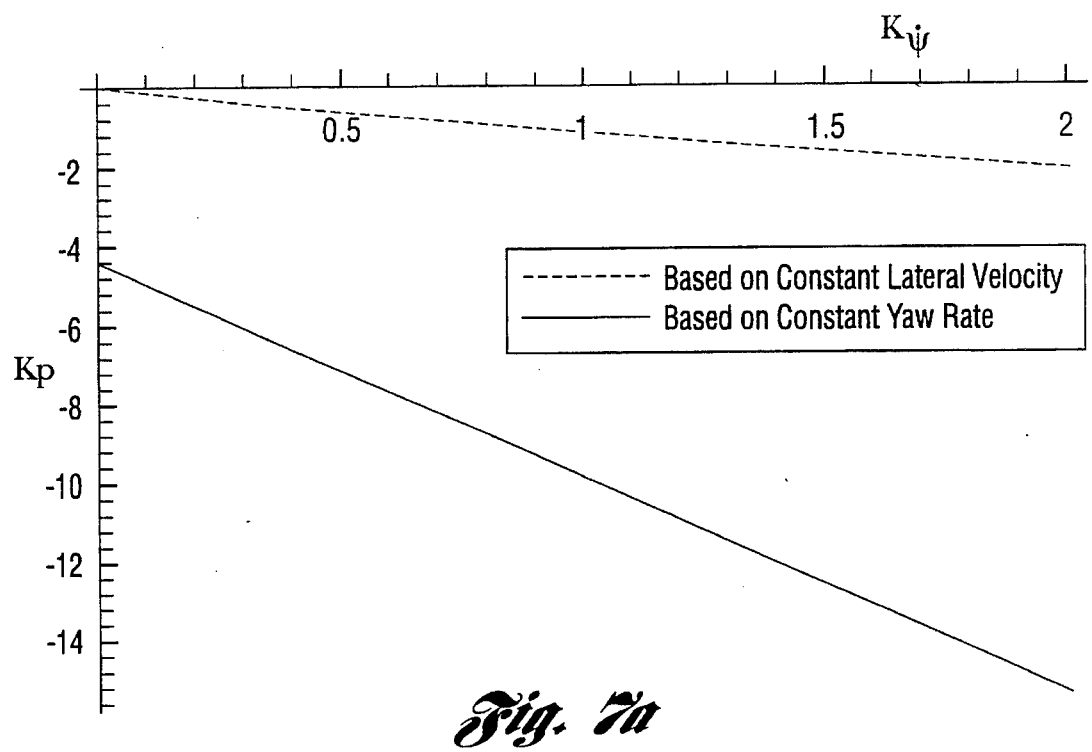
FIGS. 7a–7b are graphical illustrations of proportional gain $K_p$ and yaw rate gain $K_{d\psi/dt}$ for a FWD vehicle based on lateral velocity and yaw rate for 25% tire slip and 50% tire slip, respectively.
Figure 7B:
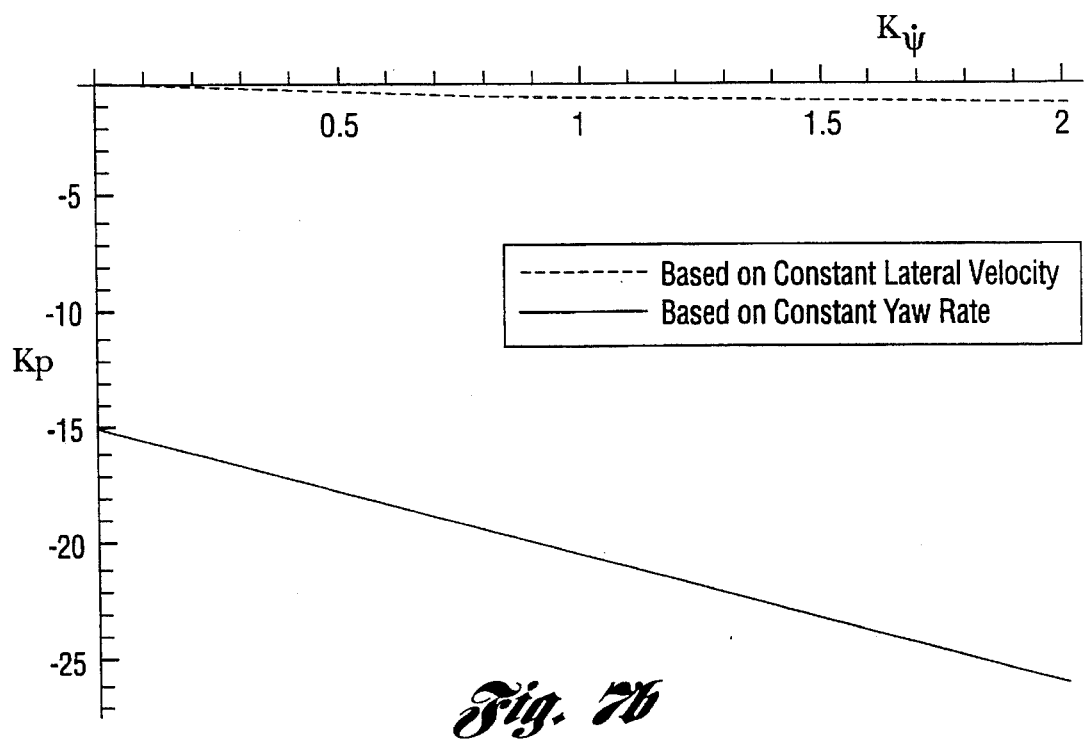

Comparing Equations (11) and (12), it is seen that they are substantially different. For a 4WS/FWD vehicle, FIGS. 7a–7b show the corresponding changes in $K_p$ as a function of $K_{d\psi/dt}$ for 25% and 50% slip, respectively. Comparing FIG. 5 to FIGS. 7a–7b, it should be appreciated that for a given slip, lateral velocity and yaw rate influence the behavior of FWD vehicles differently than for RWD vehicles. When utilizing FIGS. 7a–7b to obtain $K_{d\psi/dt}$ based on $K_p$, one possibility would be to average the values of $K_{d\psi/dt}$ and $K_p$ by the ECM to obtain a third trace in between the two shown in the Figures. Since the area between the two traces of FIGS. 7a–7b represent vehicle stability, this averaging would help to ensure vehicle stability, even if slight deviations in the values of $K_{d\psi/dt}$ and $K_p$ occur.

Figure 8A:
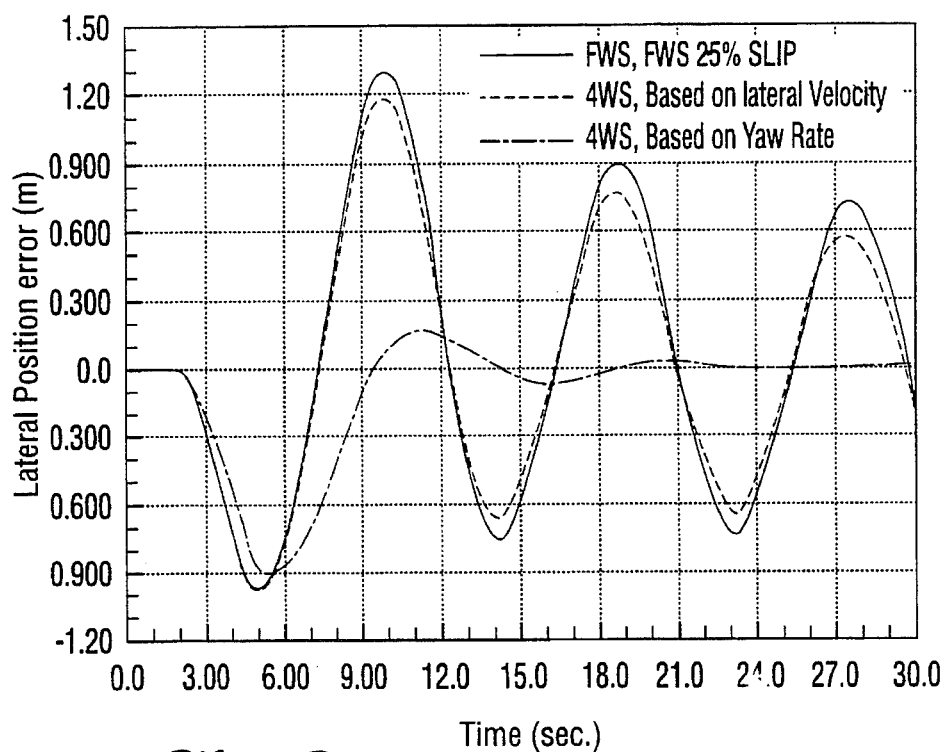
FIGS. 8a–8b are graphical illustrations comparing the vehicle performance of a FWS/FWD no-load vehicle to 4WS/FWD loaded vehicles controlled based on lateral velocity and yaw rate.
Figure 8B:
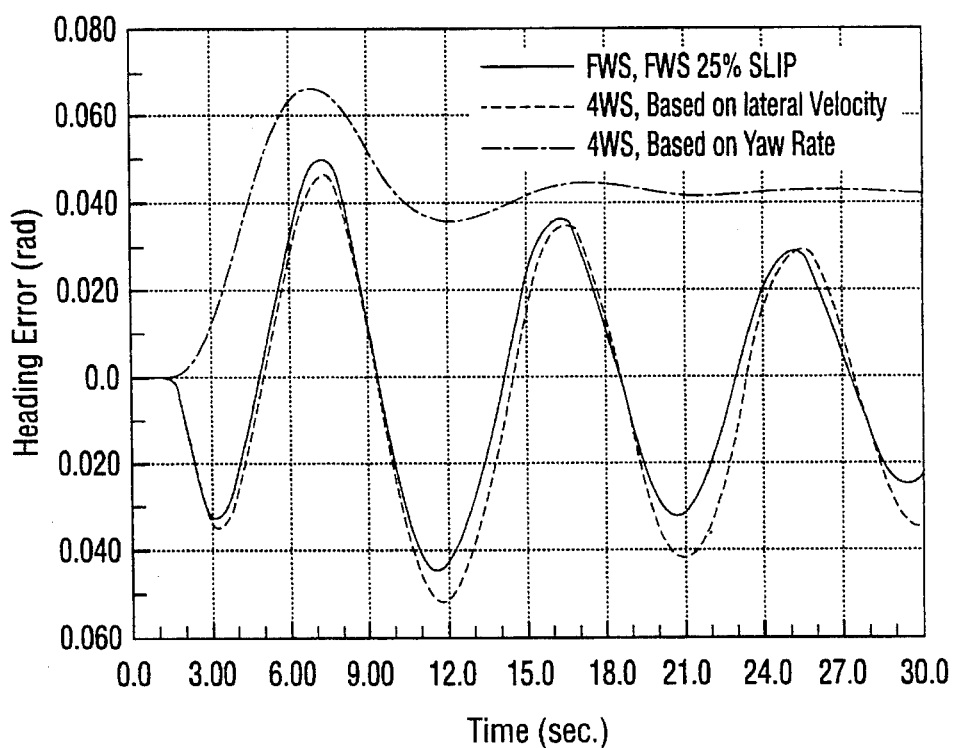

Referring now to FIGS. 8a–8b, simulations were performed utilizing a FWD vehicle with 25% slip at the front. The vehicle was travelling at speed of 15 m/s on a slippery road surface (e.g. μ=0.3). As shown, a FWS and two 4WS cars were compared. The 4WS control strategies were chosen based on the curve of FIG. 7a at $K_{d\psi/dt}$=1.0. As a result, the rear wheel steer angle for the 4WS simulation were:

$$\delta_r = \frac{d\psi}{dt} - 0.942\delta_f \quad (13)$$

based on steady-state lateral velocity, and $$\delta_r = \frac{d\psi}{dt} - 9.86\delta_f \quad (14)$$

based on steady-state yaw rate. As shown in FIGS. 8a–8b, the 4WS using Equation 13 (i.e. steady-state lateral velocity) is nearly identical to the FWS simulation, and the 4WS using Equation 14 (i.e. steady-state yaw rate) highly improves the performance of the vehicle.

Even though the FWD vehicle shows the possibility of improvement in vehicle handling using 4WS, the gain selection is rather sensitive process. For example, decreasing the $K_{d\psi/dt}$ to 0.7 in Equation 14 can result in an unstable system. Also, decreasing the $K_p$ to −14 in Equation 14 yields an unstable system, and increasing $K_p$ reduces the effect of 4WS to FWS.

In summary, when there is no load (i.e. no driving and/or brake torques) on tires, the 4WS can highly improve the handling properties of vehicles during emergency situations. This improvement is more significant on some vehicles, due to associated vehicle properties, such as mass distribution and moment of inertia. 4WS has almost no effect at low lateral acceleration. In RWD vehicles, it is possible to stabilize the car using 4WS with yaw rate feedback and proportional control with respect to front steering. It is possible to control both lateral velocity and yaw rate simultaneously. The gains for these controllers are preferably obtained utilizing the linear relation of Equation 9, in which it sets both the steady state yaw rate and lateral velocity of the car to a configuration equivalent to a FWS and no load. In FWD vehicles, it is not possible to control both the steady-state yaw rate and lateral velocity. Here, it was also possible to improve the vehicle performance using 4WS by controlling the yaw rate. The gains for this controller are preferably obtained utilizing Equations 11 and 12, and possibly averaging the results as described above, in which the steady state yaw rate is set to an equivalent one with FWS and no load. This improvement is sensitive to the selection of the gains, which can cause a worse situation than FWS due to change in vehicle properties such as load, center of gravity and tire characteristics.

Yet still another approach would be to control a loaded 4WS vehicle to behave like a 4WS vehicle under a no load operating condition. In a 4WS vehicle under no load, the desired yaw rate can be expressed as follows:

$$\Psi_d = \left. \frac{(a+b)(1-K_{p_n})C_f C_{r_n}}{\frac{(a+b)^2 C_f C_{r_n}}{u} + (K\frac{d\psi}{dt_n})(a+b)C_f C_{r_n} - (aC_f - bC_{r_n})mu} \right|_{NL} \quad (15)$$

In 4WS/RWD loaded vehicle, the desired yaw rate can be expressed as:

$$\Psi_d = \left. \frac{(a+b)(1-K_{p_1})C_f C_{r_1}}{\frac{(a+b)^2 C_f C_{r_1}}{u} + K\frac{d\psi}{dt_1}(a+b)C_f C_{r_1} - (aC_f - bC_{r_1})mu} \right|_{RWD} \quad (16)$$

The resultant 4WS equation is:

$$K_{P_I} = \quad (17)$$

$$\frac{uC_f(a+b)C_{r_n}(-1+K_{p_n})}{(a+b)^2 C_f C_{r_n} - (aC_f - bC_{r_n})mu^2 + (a+b)C_f C_{r_n}K\frac{d\psi}{dt_n}u} K\frac{d\psi}{dt_1} +$$

$$\frac{(a+b)C_f C_{r_1}C_{r_n}\{(a+b)K_{p_n} + K\frac{d\psi}{dt_n}u\}}{C_{r_1}\{(a+b)^2 C_f C_{r_n} - (aC_f - bC_{r_n})mu^2 + (a+b)C_f C_{r_n}K\frac{d\psi}{dt_n}u\}} +$$

$$\frac{mu^2\{-a(C_{r_1} - C_{r_n})C_f + C_{r_n}K_{p_n}(-aC_f + bC_{r_1})\}}{C_{r_1}\{(a+b)^2 C_f C_{r_n} - (aC_f - bC_{r_n})mu^2 + (a+b)C_f C_{r_n}K\frac{d\psi}{dt_n}u\}}$$

The same results are obtainable based on lateral velocity.

A similar control strategy for 4WS/FWD vehicles is also achievable. That is, the 4WS/FWD vehicle would behave like a FWS no-load vehicle at steady-state conditions. To emulate this condition so that the 4WS/FWD vehicle has the appropriate yaw rate, the proportional steer control gain can be represented as:

$$K_{P_I} = \quad (18)$$

$$\frac{u(a+b)C_r C_{f_n}(K_{P_n} - 1)}{(bC_r - aC_{f_n})mu^2 + (a+b)C_r C_{f_n}(K\frac{d\psi}{dt_n}u + a + b)} K\frac{d\psi}{dt_1} +$$

$$\frac{\{(bC_r - aC_{f_1})C_{f_n}K_{P_n} + (C_{f_1} - C_{f_n})bC_r\}mu^2}{C_{f_1}\{(bC_r - aC_{f_n})mu^2 + (a+b)C_r C_{f_n}(K\frac{d\psi}{dt_n}u + a + b)\}} +$$

$$\frac{u(a+b)C_{f_1}C_r C_{f_n}K\frac{d\psi}{dt_n} + (a+b)^2 C_{f_1}C_{f_n}C_r K_{P_n}}{C_{f_1}\{(bC_r - aC_{f_n})mu^2 + (a+b)C_r C_{f_n}(K\frac{d\psi}{dt_n}u + a + b)\}}$$

So that the 4WS/FWD vehicle has the appropriate lateral velocity, the proportional steer control gain can be represented as:

$$K_{P_I} = \frac{u(K_{P_n} - 1)C_{f_1}C_r(a+b)\{bmu^2 + a(a+b)C_{f_n}\}}{\{a(a+b)C_{f_1} + bmu^2\}\{(a+b)(a+b+K\frac{d\psi}{dt_n}u)C_{f_n}C_r + (-aC_{f_n} + bC_r)mu^2\}} K\frac{d\psi}{dt} + \quad (19)$$

$$\frac{\{(bC_r - aC_{f_1})bK_{P_n} + ab(-C_{f_n} + C_{f_1})\}m^2u^4 + b(a+b)C_{f_n}C_r K_{\psi_n}mu^3}{\{a(a+b)C_{f_1} + bmu^2\}\{(a+b)(a+b+K\frac{d\psi}{dt_n}u)C_{f_n}C_r + (-aC_{f_n} + bC_r)mu^2\}} +$$

$$\frac{\{((abC_{f_n} + b(a+b)C_{f_1})C_r - a^2C_{f_1}C_{f_n})K_{P_n} + b^2(C_{f_n} - C_{f_1})C_r\}(a+b)mu^2}{\{a(a+b)C_{f_1} + bmu^2\}\{(a+b)(a+b+K\frac{d\psi}{dt_n}u)C_{f_n}C_r + (-aC_{f_n} + bC_r)mu^2\}} +$$

$$\frac{a(a+b)^2 C_{f_1}C_{f_n}C_r\{K_{\psi_n}u + (a+b)K_{P_n}\}}{\{a(a+b)C_{f_1} + bmu^2\}\{(a+b)(a+b+K\frac{d\psi}{dt_n}u)C_{f_n}C_r + (-aC_{f_n} + bC_r)mu^2\}}$$

One of ordinary skill will appreciate that the equations presented immediately above with reference to emulating a 4WS no load vehicle can of course be utilized as described above and below in greater detail with reference to the equations for emulating a FWS no load vehicle.

Figure 9:
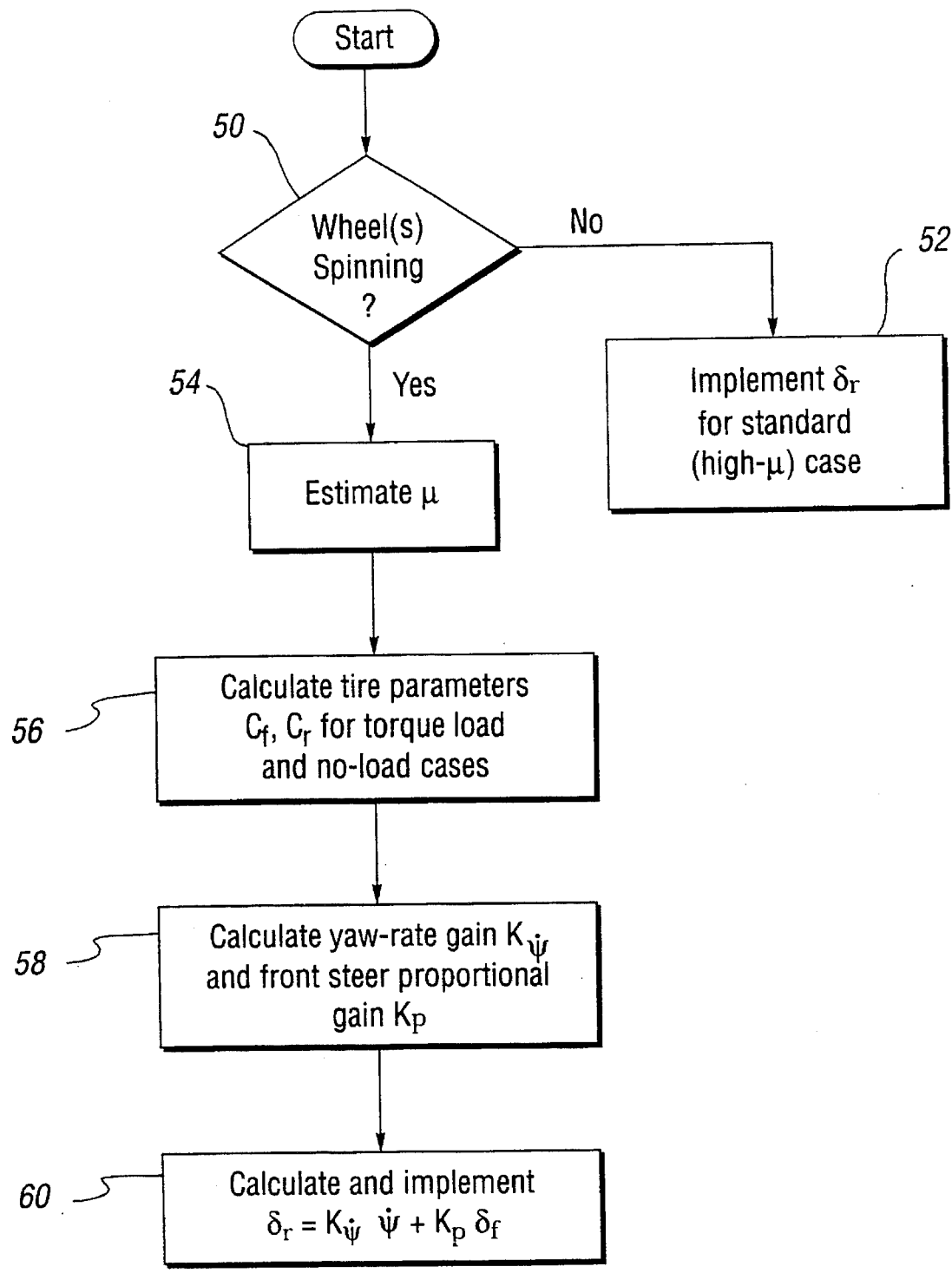
FIG. 9 is a flowchart detailing the steps of the strategy of the present invention.

Referring now to FIG. 9, there is shown a flowchart illustrating the steps of one embodiment of the strategy of the present invention. At step 50, ECM 16 determines whether or not any of the wheels 12 or 14 are spinning, based on signals from the speed sensors 20. If none of the wheels are spinning, at step 52, the four wheel steering system controls the rear steerable wheels 14 to implement the rear steer angle $\delta_r$ for a standard case.

If, however, at least one wheel is spinning at step 50, the ECM estimates the road surface coefficient of friction at step 54. Several methodologies for μ estimation are known, such as the one described in greater detail in U.S. patent application Ser. No. 07/974,636, titled "Vehicular Surface Traction Characteristic Estimation Techniques", filed Nov. 12, 1992, by Davorin Hrovat et al, and assigned to the assignee of the present invention, the specification of which is hereby expressly incorporated by reference in its entirety.

Figure 10A:
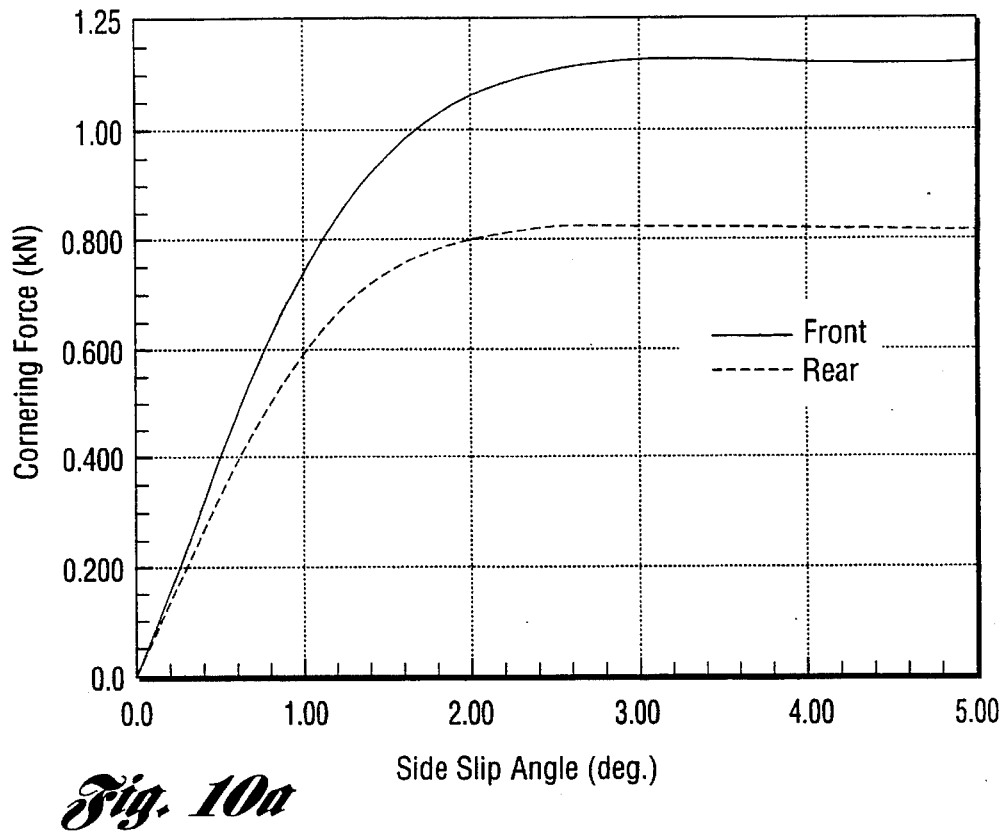
FIGS. 10a–10b are graphical illustrations of change in cornering force as a function of tire side slip angle, and change in cornering coefficient as a function of tire side slip angle, respectively, for a vehicle under a no-load condition for use with the present invention.
Figure 10B:
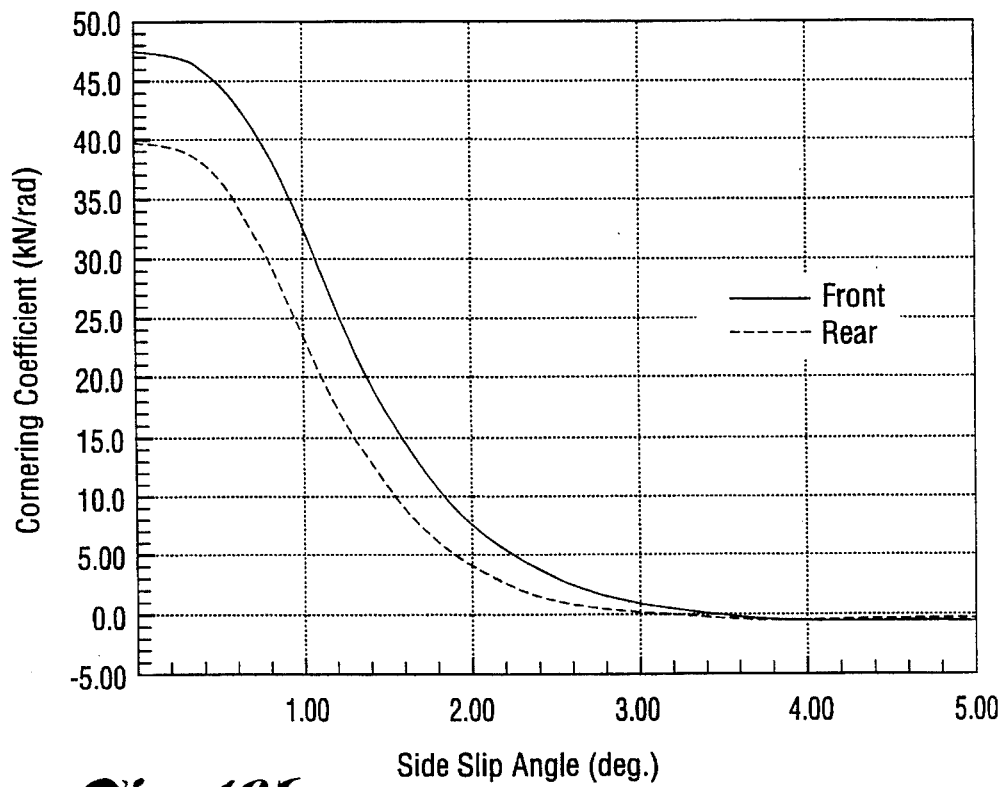

With continuing reference to FIG. 9, at step 56 the ECM calculates front and rear tire cornering coefficients $C_f$ and $C_r$, respectively, for a torque loaded vehicle and for a vehicle under no torque load. Typically, the cornering coefficients are determined as the slope of a tire curve, such as the tire curve shown in FIG. 10a. Preferably, the cornering coefficients are taken from the curve at zero side slip angle. Thus, at a zero side slip angle, $C_f$ would have a value of about 47.5 kN/rad and $C_r$ would have a value of a little under 40 kN/rad, as shown in FIG. 10b. Based on these tire curves, a table of values can be identified and stored in the ECM memory. Utilizing this table, the slopes can be determined in a known manner for $C_f$ and $C_r$.

Once the coefficients are identified, at step 58 the ECM calculates the yaw rate gain $K_{d\psi/dt}$ and front steer proportional gain $K_p$ as described in greater detail above (i.e. utilizing Equation 9 for RWD vehicles and Equations 11 or 12 for FWD vehicles to emulate FWS no load, or Equation 15 for RWD vehicles and Equations 18 or 19 for FWD vehicles to emulate 4WS no load). Once the control gains are determined, at step 60 the ECM calculates the rear steer angle $\delta_r = K_{d\psi/dt}(d\psi/dt)$ and accordingly controls the four wheel steering system.

Figure 11:
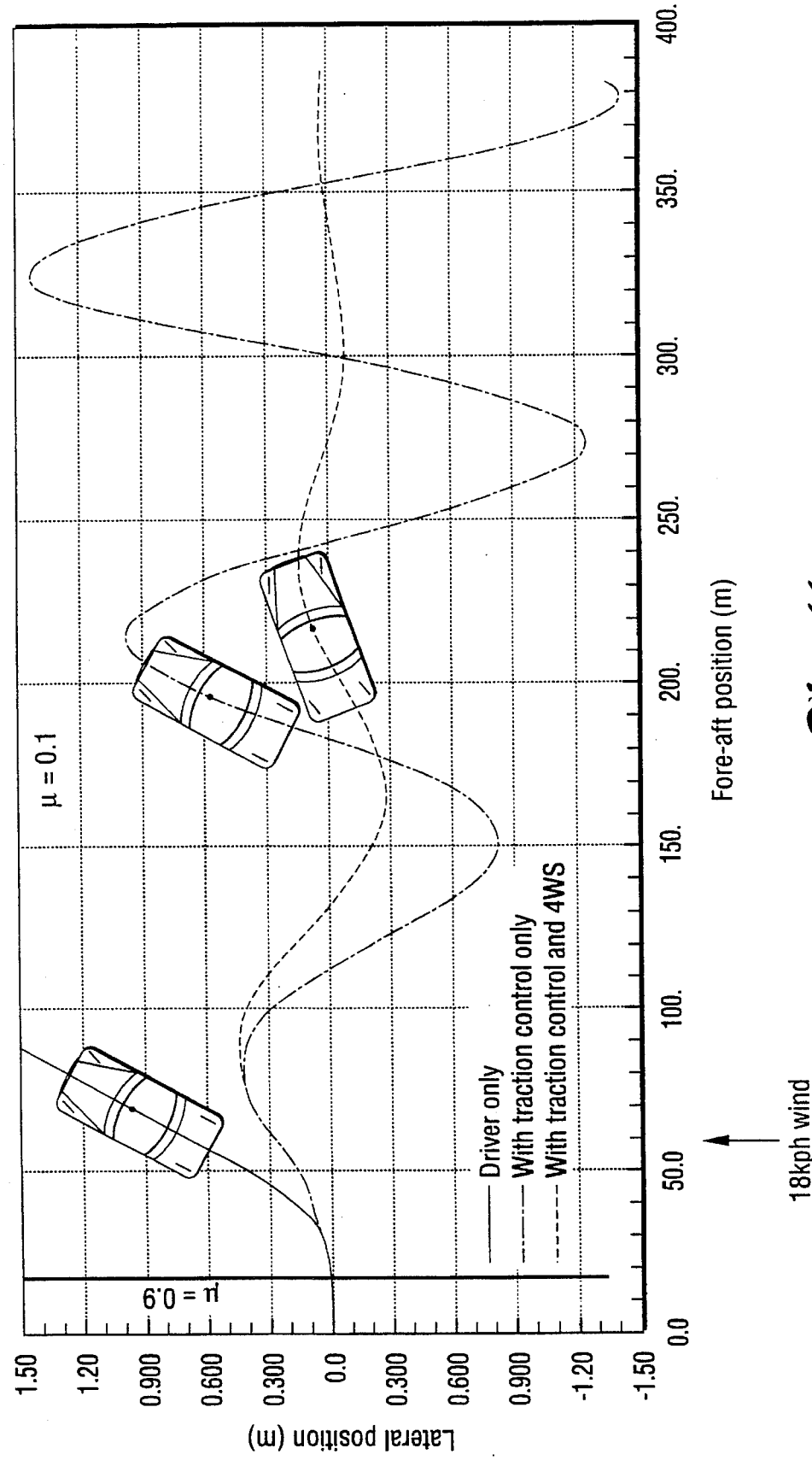
FIG. 11 is a graphical illustration of the path of a vehicle on a low μ road surface when the vehicle is under driver-only control, when the vehicle includes traction control, and when includes traction control and a four wheel steering system controlled according to the present invention.

Referring now to FIG. 11, there is a graphical illustration of the results possible utilizing the strategy of the present invention. FIG. 11 illustrates the path of vehicle exiting a high $\mu$ (i.e. $\mu=0.9$) road surface and entering a low $\mu$ road surface (i.e. $\mu=0.1$, such as ice) while experiencing a side wind of about 18 kph. More specifically, the figure illustrates the lateral position of the vehicle. The first trace, which leaves the page at a fore-aft position of about 80 m, illustrates the vehicle path based on driver control only. The second trace, which oscillates uncontrollably, illustrates the resulting vehicle path if the vehicle includes some form of traction control, such as that described in greater detail in U.S. patent application Ser. No. 07/974,756, titled "Method For Vehicular Wheel Spin Control That Adapts To Different Road Traction Characteristics", filed Nov. 12, 1992, by Davorin Hrovat et al, assigned to the assignee of the present invention, the specification of which is hereby expressly incorporated by reference in its entirety. The third trace, which oscillates in a controlled manner, is indicative of the vehicle path when the vehicle includes a traction control system and a four wheel steering system controlled according to the present invention. The advantages of the present invention are apparent from FIG. 11.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. For use in a vehicle including front wheels, rear wheels, a four wheel steering system and an electronic control unit having memory, a method of controlling the four wheel steering system comprising:

applying a torque load to at least one of the vehicle wheels;

determining at least one control gain for the four wheel steering system so that the torque loaded vehicle behaves like a front wheel steering vehicle under no torque load; and controlling the four wheel steering system according to the control gain, thereby improving directional stability of the vehicle travelling on a slippery road surface;

the step of determining at least one control gain comprising determining a yaw rate control gain based on vehicle stability requirements, the step of determining at least one control gain further comprising determining a proportional steer control gain based on the yaw rate control gain;

the proportional steer control gain $K_p$ for a rear wheel drive vehicle being determined according to:

$$K_p = -\frac{uC_f(a+b)C_{r_n}}{(a+b)^2 C_f C_{r_n} - (aC_f - bC_{r_n})mu^2} \frac{Kd\psi}{dt} - \frac{amu^2(C_{r_1} - C_{r_n})C_f}{C_{r_1}((a+b)^2 C_f C_{r_n} - (aC_f - bC_{r_n})mu^2)}$$

2. For use in a vehicle including front wheels, rear wheels, a four wheel steering system and an electronic control unit having memory, a method of controlling the four wheel steering system comprising:

applying a torque load to at least one of the vehicle wheels;

determining at least one control gain for the four wheel steering system so that the torque loaded vehicle behaves like a front wheel steering vehicle under no torque load;

controlling the four wheel steering system according to the control gain, thereby improving directional stability of the vehicle travelling on a slippery road surface;

the step of determining at least one control gain comprising determining a yaw rate control gain based on vehicle stability requirements, the step of determining at least one control gain further comprising determining a proportional steer control gain based on the yaw rate control gain;

determining the front wheel tire steering angle, the step of controlling the four wheel steering system including steering the rear wheels based on the proportional steer control gain, the yaw rate control gain and the front tire steering angle;

storing a plurality of yaw rate control gain and proportional steer control gain pairs in said memory;

determining percent slip of the rear wheels in relation to the road surface; and retrieving a control gain pair from the memory based on the percent slip of the rear wheels for controlling the four wheel steering system;

the proportional steer control gain $K_p$ for a front wheel drive vehicle having a desired yaw-rate being determined according to:

$$K_p = -\frac{uC_r(a+b)C_{f_n}}{(a+b)^2 C_r C_{f_n} - (aC_{f_n} - bC_r)mu^2} \frac{Kd\psi}{dt} - \frac{bmu^2(-C_{f_1} - C_{f_n})C_r}{C_{f_1}((a+b)^2 C_r C_{f_n} - (aC_{f_n} - bC_r)mu^2)}$$

3. For use in a vehicle including front wheels, rear wheels, a four wheel steering system and an electronic control unit having memory, a method of controlling the four wheel steering system comprising:

applying a torque load to at least one of the vehicle wheels;

determining at least one control gain for the four wheel steering system so that the torque loaded vehicle behaves like a front wheel steering vehicle under no torque load; and controlling the four wheel steering system according to the control gain, thereby improving directional stability of the vehicle travelling on a slippery road surface;

the step of determining at least one control gain comprising determining a yaw rate control gain based on vehicle stability requirements, the step of determining at least one control gain further comprising determining a proportional steer control gain based on the yaw rate control gain;

the proportional steer control gain $K_p$ for a front wheel drive vehicle having a desired lateral velocity being determined according to:

$$K_p = -\frac{uC_rC_{f_1}(a+b)\{a(a+b)C_{f_n}+bmu^2\}}{\{a(a+b)C_{f_1}+bmu^2\}\{(a+b)^2C_rC_{f_n}-(aC_{f_n}-bC_r)mu^2\}} K\frac{d\psi}{dt} -$$

$$\frac{bmu^2(C_{f_1}-C_{f_n})\{b(a+b)C_r-amu^2\}}{\{a(a+b)C_{f_1}+bmu^2\}\{(a+b)^2C_rC_{f_n}-(aC_{f_n}-bC_r)mu^2\}}.$$

4. For use with an automotive vehicle including four wheels and a four wheel steering system controlled by an electronic control unit having memory, the four wheel steering system for steering the four wheels while at least one of the wheels is under a torque load, the steering system further comprising:

means for determining at least one control gain for the four wheel steering system so that the torque loaded vehicle behaves like a front wheel steering vehicle under no torque load; and means for controlling the four wheel steering system according to the control gain, thereby improving directional stability of the vehicle travelling on a slippery road surface;

the means for determining at least one control gain including means for determining a yaw rate control gain based on vehicle stability requirements, the means for determining at least one control gain further comprising means for determining a proportional steer control gain based on the yaw rate control gain;

the means for determining a proportional steer control gain effecting proportional steer control gain ($K_p$) for a rear wheel drive vehicle according to:

$$K_p = -\frac{uC_f(a+b)C_{r_n}}{(a+b)^2C_fC_{r_n}-(aC_f-bC_{r_n})mu^2} K\frac{d\psi}{dt} -$$

$$\frac{amu^2(C_{r_1}-C_{r_n})C_f}{C_{r_1}((a+b)^2C_fC_{r_n}-(aC_f-bC_{r_n})mu^2)}.$$

5. For use with an automotive vehicle including four wheels and a four wheel steering system controlled by an electronic control unit having memory for steering the four wheels while at least one of the wheels is under a torque load, the steering system comprising:

means for determining at least one control gain for the four wheel steering system so that the torque loaded vehicle behaves like a front wheel steering vehicle under no torque load; and means for controlling the four wheel steering system according to the control gain, thereby improving directional stability of the vehicle travelling on a slippery road surface;

the means for determining at least one control gain including means for determining a yaw rate control gain based on vehicle stability requirements, the means for determining at least one control gain further comprising means for determining a proportional steer control gain based on the yaw rate control gain;

the means for determining a proportional steer control gain $K_p$ determining the proportional steer control gain for a front wheel drive vehicle having a desired yaw-rate according to:

$$K_p = -\frac{uC_r(a+b)C_{f_n}}{(a+b)^2C_rC_{f_n}-(aC_{f_n}-bC_r)mu^2} K\frac{d\psi}{dt} -$$

$$\frac{bmu^2(-C_{f_1}+C_{f_n})C_r}{C_{f_1}((a+b)^2C_rC_{f_n}-(aC_{f_n}-bC_r))mu^2}.$$

6. For use with an automotive vehicle including four wheels and a four wheel steering system controlled by an electronic control unit having memory for steering the four wheels while at least one of the wheels is under a torque load, the steering system further comprising:

means for determining at least one control gain for the four wheel steering system so that the torque loaded vehicle behaves like a front wheel steering vehicle under no torque load; and means for controlling the four wheel steering system according to the control gain, thereby improving directional stability of the vehicle travelling on a slippery road surface;

the means for determining at least one control gain including means for determining a yaw rate control gain based on vehicle stability requirements, the means for determining at least one control gain further comprising means for determining a proportional steer control gain based on the yaw rate control gain;

the means for determining the proportional steer control gain $K_p$ determining the proportional steer control gain for a front wheel drive vehicle having a desired lateral velocity according to:

$$K_p = -\frac{uC_rC_{f_1}(a+b)\{a(a+b)C_{f_n}+bmu^2\}}{\{a(a+b)C_{f_1}+bmu^2\}\{(a+b)^2C_rC_{f_n}-(aC_{f_n}-bC_r)mu^2\}} K\frac{d\psi}{dt} -$$

$$\frac{bmu^2(C_{f_1}-C_{f_n})\{b(a+b)C_r-amu^2\}}{\{a(a+b)C_{f_1}+bmu^2\}\{(a+b)^2C_rC_{f_n}-(aC_{f_n}-bC_r)mu^2\}}.$$

7. For use in a vehicle including front wheels, rear wheels, a four wheel steering system and an electronic control unit having memory, a method of controlling the four wheel steering system comprising:

applying a torque load to at least one of the vehicle wheels;

determining at least one control gain for the four wheel steering system so that the torque loaded vehicle behaves like a four wheel steering vehicle under no torque load; and controlling the four wheel steering system according to the control gain, thereby improving directional stability of the vehicle travelling on a slippery road surface;

the step of determining at least one control gain comprising determining a yaw rate control gain based on vehicle stability requirements, the step of determining at least one control gain further comprising determining a proportional steer control gain based on the yaw rate control gain;

the proportional steer control gain $K_p$ for a rear wheel drive vehicle being determined according to:

$$K_{p_1} = \frac{uC_f(a+b)C_{r_n}(-1+K_{p_n})}{(a+b)^2C_fC_{r_n}-(aC_f-bC_{r_n})mu^2+(a+b)C_fC_{r_n}K\frac{d\psi}{dt_n}u} K\frac{d\psi}{dt_1} +$$

$$\frac{(a+b)C_fC_{r_1}C_{r_n}\{(a+b)K_{p_n}+K\frac{d\psi}{dt_n}u\}}{C_{r_1}\{(a+b)^2C_fC_{r_n}-(aC_f-bC_{r_n})mu^2+(a+b)C_fC_{r_n}K\frac{d\psi}{dt_n}u\}} +$$

$$\frac{mu^2\{-a(C_{r_1}-C_{r_n})C_f+C_{r_n}K_{p_n}(-aC_f+bC_{r_1})\}}{C_{r_1}\{(a+b)^2C_fC_{r_n}-(aC_f-bC_{r_n})mu^2+(a+b)C_fC_{r_n}K\frac{d\psi}{dt_n}u\}}.$$

8. For use in a vehicle including front wheels, rear wheels, a four wheel steering system and an electronic control unit having memory, a method of controlling the four wheel steering system comprising:

applying a torque load to at least one of the vehicle wheels;

determining at least one control gain for the four wheel steering system so that the torque loaded vehicle behaves like a four wheel steering vehicle under no torque load; and controlling the four wheel steering system according to the control gain, thereby improving directional stability of the vehicle travelling on a slippery road surface;

the step of determining at least one control gain comprising determining a yaw rate control gain based on vehicle stability requirements, the step of determining at least one control gain further comprising determining a proportional steer control gain based on the yaw rate control gain;

the proportional steer control gain $K_p$ for a front wheel drive vehicle having a desired yaw-rate being determined according to:

$$K_{p_1} = \frac{u(a+b)C_rC_{f_n}(K_{P_n}-1)}{(bC_r-aC_{f_n})mu^2+(a+b)C_rC_{f_n}(K\frac{d\psi}{dt_n}u+a+b)} K\frac{d\psi}{dt_1}$$

-continued $$\frac{\{(bC_r-aC_{f_1})C_{f_n}K_{P_n}+(C_{f_1}-C_{f_n})bC_r\}mu^2}{C_{f_1}\{(bC_r-aC_{f_n})mu^2+(a+b)C_rC_{f_n}(K\frac{d\psi}{dt_n}u+a+b)\}} +$$

$$\frac{u(a+b)C_{f_1}C_rC_{f_n}K\frac{d\psi}{dt_n}+(a+b)^2C_{f_1}C_{f_n}C_rK_{P_n}}{C_{f_1}\{(bC_r-aC_{f_n})mu^2+(a+b)C_rC_{f_n}(K\frac{d\psi}{dt_n}u+a+b)\}}.$$

9. For use in a vehicle including front wheels, rear wheels, a four wheel steering system and an electronic control unit having memory, a method of controlling the four wheel steering system comprising:

applying a torque load to at least one of the vehicle wheels;

determining at least one control gain for the four wheel steering system so that the torque loaded vehicle behaves like a four wheel steering vehicle under no torque load; and controlling the four wheel steering system according to the control gain, thereby improving directional stability of the vehicle travelling on a slippery road surface;

the step of determining at least one control gain comprising determining a yaw rate control gain based on vehicle stability requirements, the step of determining at least one control gain further comprising determining a proportional steer control gain based on the yaw rate control gain;

the proportional steer control gain $K_p$ for a front wheel drive vehicle having a desired lateral velocity determined according to:

$$K_{p_1} = \frac{u(K_{P_n}-1)C_{f_1}C_r(a+b)\{bmu^2+a(a+b)C_{f_n}\}}{\{a(a+b)C_{f_1}+bmu^2\}\{(a+b)(a+b+K\frac{d\psi}{dt_n}u)C_{f_n}C_r+(-aC_{f_n}+bC_r)mu^2\}} K\frac{d\psi}{dt_1} +$$

$$\frac{\{(bC_r-aC_{f_1})bK_{P_n}+ab(-C_{f_n}+C_{f_1})\}m^2u^4+b(a+b)C_{f_n}C_rK_{\psi_n}mu^3}{\{a(a+b)C_{f_1}+bmu^2\}\{(a+b)(a+b+K\frac{d\psi}{dt_n}u)C_{f_n}C_r+(-aC_{f_n}+bC_r)mu^2\}} +$$

$$\frac{\{((abC_{f_n}+b(a+b)C_{f_1})C_r-a^2C_{f_1}C_{f_n})K_{P_n}+b^2(C_{f_n}-C_{f_1})C_r\}(a+b)mu^2}{\{a(a+b)C_{f_1}+bmu^2\}\{(a+b)(a+b+K\frac{d\psi}{dt_n}u)C_{f_n}C_r+(-aC_{f_n}+bC_r)mu^2\}} +$$

$$\frac{a(a+b)^2C_{f_1}C_{f_n}C_r\{K_{\psi_n}u+(a+b)K_{P_n}\}}{\{a(a+b)C_{f_1}+bmu^2\}\{(a+b)(a+b+K\frac{d\psi}{dt_n}u)C_{f_n}C_r+(-aC_{f_n}+bC_r)mu^2\}}.$$

* * * * *